(12) United States Patent  
Lan et al.

(10) Patent No.: US 9,612,508 B2  
(45) Date of Patent: Apr. 4, 2017

(54) ELECTRONIC DEVICE WITH PROJECTOR

(71) Applicant: Lenovo (Beijing) Co., Ltd., Beijing (CN)

(72) Inventors: Yuming Lan, Beijing (CN); Xiang Gao, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 66 days.

(21) Appl. No.: 14/619,248

(22) Filed: Feb. 11, 2015

(65) Prior Publication Data

US 2016/0054756 A1    Feb. 25, 2016

(30) Foreign Application Priority Data

Aug. 22, 2014   (CN) .................... 2014 2 0478453 U  
Sep. 4, 2014   (CN) .................... 2014 2 0508840 U  
Sep. 4, 2014   (CN) .................... 2014 2 0508970 U  
Sep. 4, 2014   (CN) .................... 2014 2 0508971 U

(51) Int. Cl.

| | | |
|---|---|---|
| *G03B 21/14* | (2006.01) | |
| *G02B 7/10* | (2006.01) | |
| *G06F 1/16* | (2006.01) | |
| *H04N 5/225* | (2006.01) | |
| *H04N 5/232* | (2006.01) | |
| *G03B 3/10* | (2006.01) | |

(52) U.S. Cl.
CPC ............. *G03B 21/145* (2013.01); *G02B 7/10* (2013.01); *G06F 1/1639* (2013.01); *G06F 1/1686* (2013.01); *G06F 1/1688* (2013.01); *H04N 5/2253* (2013.01); *H04N 5/2254* (2013.01); *H04N 5/2257* (2013.01); *H04N 5/23212* (2013.01); *H04N 5/23296* (2013.01); *G03B 3/10* (2013.01)

(58) Field of Classification Search
CPC .......... G02B 7/10; G03B 21/145; G03B 3/10; G06F 1/1639; G06F 1/1686; G06F 1/1688; H04N 5/2253; H04N 5/2254; H04N 5/23212; H04N 5/23296
See application file for complete search history.

(56) References Cited

U.S. PATENT DOCUMENTS

| | | | | |
|---|---|---|---|---|
| 2002/0118151 | A1* | 8/2002 | Chen ..................... | G06F 1/1616 345/84 |
| 2014/0247551 | A1* | 9/2014 | Xia ....................... | G06F 1/1681 361/679.43 |
| 2015/0029140 | A1* | 1/2015 | Hwang ................. | G06F 3/0421 345/174 |

* cited by examiner

*Primary Examiner* — Sultan Chowdhury  
*Assistant Examiner* — Magda Cruz  
(74) *Attorney, Agent, or Firm* — Harness, Dickey & Pierce, P.L.C.

(57) ABSTRACT

An electronic device is provided, which includes: a first component which includes a first portion and a second portion opposite to the first portion, with the thickness of the first component is gradually decreased from the first portion to the second portion; a display unit arranged on a first surface of the first component; and a projection component arranged on the first portion.

30 Claims, 17 Drawing Sheets

ELECTRONIC DEVICE WITH PROJECTOR

The present application claims the priority to Chinese Patent disclosure No. 201420478453.0, entitled as "PROJECTION AND CAMERA DEVICE", filed on Aug. 22, 2014 with State Intellectual Property Office of People's Republic of China, which is incorporated herein by reference in its entirety.

The present application claims the priority to Chinese Patent disclosure No. 201420508840.4, entitled as "ELECTRONIC DEVICE", filed on Sep. 4, 2014 with State Intellectual Property Office of People's Republic of China, which is incorporated herein by reference in its entirety.

The present application claims the priority to Chinese Patent disclosure No. 201420508970.8, entitled as "ELECTRONIC DEVICE", filed on Sep. 4, 2014 with State Intellectual Property Office of People's Republic of China, which is incorporated herein by reference in its entirety.

The present application claims the priority to Chinese Patent disclosure No. 201420508971.2, entitled as "ELECTRONIC DEVICE", filed on Sep. 4, 2014 with State Intellectual Property Office of People's Republic of China, which is incorporated herein by reference in its entirety.

FIELD

The present disclosure relates to the field of electronic technology, and in particular to an electronic device.

BACKGROUND

With the development of technology, more and more electronic devices, such as smart phones, tablet computers, laptops and smart televisions and so on, appear in people's lives. There devices greatly facilitate people's lives.

Currently, contents may be displayed by using a projection in many situations. For example, a conference content pre-stored in an electronic device is projected in a conference, and activity rules and product information are projected in a large scale exhibition. In conventional technologies, a projection apparatus is integrated in a tablet computer to make it more convenient for a user to carry and use. In practice, if the height of projection needs to be adjusted, an additional things need to be put under the tablet computer to adjust the height of projection since the thickness of the body of the tablet computer is uniform.

Since the thickness of the body of the tablet computer in the conventional technologies is uniform and the height of the projection apparatus arranged on the tablet computer is constant, the projection height needs to be adjusted in other ways such as raising the tablet computer.

Further, there is no focusing button for projection in the tablet computer in the conventional technology. Therefore, the tablet computer is moved forward or backward when the focal length is required to be adjusted for the projector.

Besides, in the conventional technologies, the projection apparatus and the camera are two separate devices. In a conventional electronic device, a projection function of the projection apparatus and a camera function of the camera are simply added to obtain an integrated function.

SUMMARY

The present disclosure provides an electronic device to solve the technical problem that the electronic device in the conventional technologies can not adjust a projection height by utilizing a structure design of the electronic device itself, so as to achieve a technical effect that the projection height is adjusted by utilizing the structure design of the electronic device itself.

An electronic device is provided in the disclosure, which includes:

a first component, including a first portion and a second portion opposite to the first portion; wherein the thickness of the first component is gradually decreased from the first portion to the second portion;

a display unit, arranged on a first surface of the first component; and a projection component, arranged on the first portion.

An electronic device is provided in the disclosure, which includes:

a first component, including a display unit arranged on a first surface of the first component;

a second component, arranged on a first portion of the first component and including a connecting shaft and a support, with the connecting shaft including a cavity; and a projection component, arranged in the cavity;

wherein the support is movable with respect to the first component via the connecting shaft, and the support is capable of supporting the first component when being moved to a first relative location with respect to the first component.

The body of the electronic device provided in the technical solutions according to the embodiments of the present disclosure is wedge-shaped, that is, one side of the body is thinner while the other side is thicker. A rotatable support capable of supporting the body is arranged on the thicker side of the body and a projection component is arranged on the thicker side of the body. In practice, the height of the electronic device may be adjusted by only rotating the support, so that the projection height is adjusted. It can be seen that, the technical solutions according to the embodiments of the present disclosure solve the technical problem that the electronic device in the conventional technologies can not adjust the projection height by utilizing the structure design of the electronic device itself, and achieve a technical effect that the electronic device adjusts the projection height by utilizing the structure design of the electronic device itself.

According to the technical solutions of the embodiments of the present disclosure, a cavity is arranged on one side of the body of the electronic device, and a battery and a projection component are coaxially placed in the cavity. So that a space of the electronic device is reused effectively instead of designing a separate space for the projection component in the conventional technologies, hence the cost of product is reduced. Therefore, it is achieved a technical effect that the cost of product is reduced by effectively reusing the space, according to the technical solutions of the embodiments of the present disclosure.

According to the technical solutions of the embodiments of the present disclosure, the weight of the side of the connecting shaft of the electronic device is increased because a cavity structure is arranged in the connecting shaft of the electronic device and the projection component is placed in the cavity. Hence it is achieved a technical effect that the center of gravity of the electronic device is moved lower and the support arranged on the connecting shaft can support the electronic device more steadily.

According to the technical solutions of the embodiments of the present disclosure, when the electronic device is in a touch mode, that is, when the electronic device is supported on a flat surface by both the support and the second portion of the electronic device, the display unit of the electronic device is placed upwardly to facilitate a user's operation. Moreover, a projection content may be operated by correspondingly operating a current display content of the display unit, for example, an important content is displayed in highlight. In this way, the experience of user is improved greatly.

According to the technical solutions of the embodiments of the disclosure, a hole is provided on the support of the electronic device, and the support is movable relative to the first component via the connecting shaft; in the case that the support is closely against the second surface, the at least one input/output component, for example a rear camera or a subwoofer, is arranged inside the hole. Hence the technical problem in the conventional technology that the support blocks the rear camera or the subwoofer in the tablet computer is effectively solved, thereby achieving a technical effect that the support does not block the rear camera or the subwoofer in the tablet computer.

According to the technical solutions of the embodiments of the disclosure, a hole is provided on the support of the electronic device, and the support is movable relative to the first component via the connecting shaft; in the case that the support is closely against the second surface, the at least one input/output component, for example a rear camera, is arranged inside the hole. Hence the technical problem in the conventional technology that the rear camera can not work due to being blocked in the tablet computer is effectively solved, thereby achieving a technical effect that the rear camera can work.

According to the technical solutions of the embodiments of the disclosure, a hole is provided on the support of the electronic device, and the support is movable relative to the first component via the connecting shaft; in the case that the support is closely against the second surface, the at least one input/output component, for example a subwoofer, is arranged inside the hole and is not blocked. Hence by utilizing the technical solutions of the embodiments of the disclosure, it's avoided that the subwoofer is influenced on a bass effect due to being blocked, thus the technical problem in the conventional technology that the subwoofer can not work due to being blocked in the tablet computer is effectively solved, and a technical effect that the subwoofer is not influenced is achieved.

According to the technical solutions of the embodiments of the disclosure, a starting button is provided at the hole-corresponding-region, and the starting button is provided with a separating element; in the case that the support is closely against the second surface and a pressure is applied to the starting button, the separating element is pushed to squeeze the retaining snap, such that the retaining snap is separated from the retaining groove, and thus the support is departed from the second surface; therefore, once the starting button is pressed down, the support is depart from the second surface. Therefore, the support overlaps with the second surface or being far away from the second surface easily via the starting button.

According to the technical solutions of the embodiments of the disclosure, the support is movable relative to the first component via the connecting shaft; in the case that the angle between the support and the first component changes when the support moves relatively to the first component, the relative height of the projection component arranged at the first end of the first portion changes, thereby adjusting the height of the projection component, hence achieving a technical effect of adjusting the height of the projection component.

According to the technical solutions of the embodiments of the disclosure, a hole is provided on the support of the electronic device; in the case that the support is departed from the second surface, and the angle between the support and the first component is greater than or equal to a preset angle when the support moves relative to the first component, the electronic device can be suspended via the hole, thereby achieving a technical effect that the electronic device according to the disclosure not only can be supported independently via the structure of the electronic device itself, but also can be suspended via the hold on the support, and greatly improving the user experience.

In the technical solution according to the embodiments of the disclosure, the transmission structure is connected to the projection lens in the projection component, and the adjustment structure is connected to the transmission structure. In this case, when the focal length is required to be adjusted for the projection lens, only the adjustment structure is operated to move, the transmission structure connected to the adjustment structure is driven to move, and thus the movement of the transmission structure drives the projection lens to zoom in or out, since the transmission structure is connected to the projection lens. Therefore, the technique problem of the electronic device in the conventional technology that it is difficult to adjust the focal length of projection by utilizing the structure design of the electronic device itself is solved, a focusing button is provided in the internal space of the electronic device, and thus the focal length of projection is adjusted by utilizing the structure design of the electronic device itself.

In the technical solution according to the embodiments of the disclosure, since the connecting shaft and the support are arranged on the first portion, the support is movable relative to the first component by means of the connecting shaft and the support is configured to support the first component. In this case, the support may be rotated by the user to different location to support the electronic device depending on different requirements, so that the electronic device in different forms is provided for the user, and thus the user experience is enhanced.

In the technical solution according to the embodiments of the disclosure, the thickness of the first component is gradually decreased from the first portion to the second portion. In this case, the center of gravity for the electronic device is lower when the first component is supported by the support, and thus the electronic device is supported more steadily.

In the technical solution according to the embodiments of the disclosure, at least one focal length value in the range of variable focal lengths for the projection lens is provided on the upper edge or the lower edge of the elongated hole. In this case, the desired focal length can be adjusted clearly by the user in the focusing operation, and thus the user experience is enhanced.

The electronic device described in the disclosure includes only one optical lens assembly. The optical lens assembly and the projection component have a first relative position relation in a case of a projection operation of the electronic device, and the optical lens assembly and the image sensing component have the first relative position relation in a case of a camera operation of the electronic device. The electronic device described in the disclosure has both the projection function and the camera function, and the projection component and the image sensing component share the one optical lens assembly. As compared with the conventional device, in the electronic device provided in the disclosure, one more optical lens assembly is saved, and the utilization of the internal space of the electronic device is increased, the structure of the electronic device is more compact, and the manufacture cost is reduced significantly.

DETAILED DESCRIPTION

The present disclosure provides an electronic device to solve the technical problem that the electronic device in the conventional technologies can not adjust a projection height by utilizing a structure design thereof, so as to achieve a technical effect that the projection height is adjusted by utilizing the structure design of the electronic device itself.

An electronic device is provided, and the electronic device includes: a first component including a first portion and a second portion opposite to the first portion, where the thickness of the first component is gradually decreased from the first portion to the second portion; a display unit arranged on a first surface of the first component; and a projection component arranged on the first portion.

The body of the electronic device is wedge-shaped. A rotatable support capable of supporting the body is arranged on a thicker side of the body, and a projection component is arranged on the first portion. In practice, the height of the electronic device may be adjusted by only rotating the support, thus the height of projection is adjusted. Therefore, the technical solutions according to the embodiments of the present disclosure solve the technical problem that the electronic device in the conventional technologies can not adjust the projection height by utilizing the structure design of the electronic device itself, so as to achieve a technical effect that the projection height is adjusted by utilizing the structure design of the electronic device itself.

Figure 1:
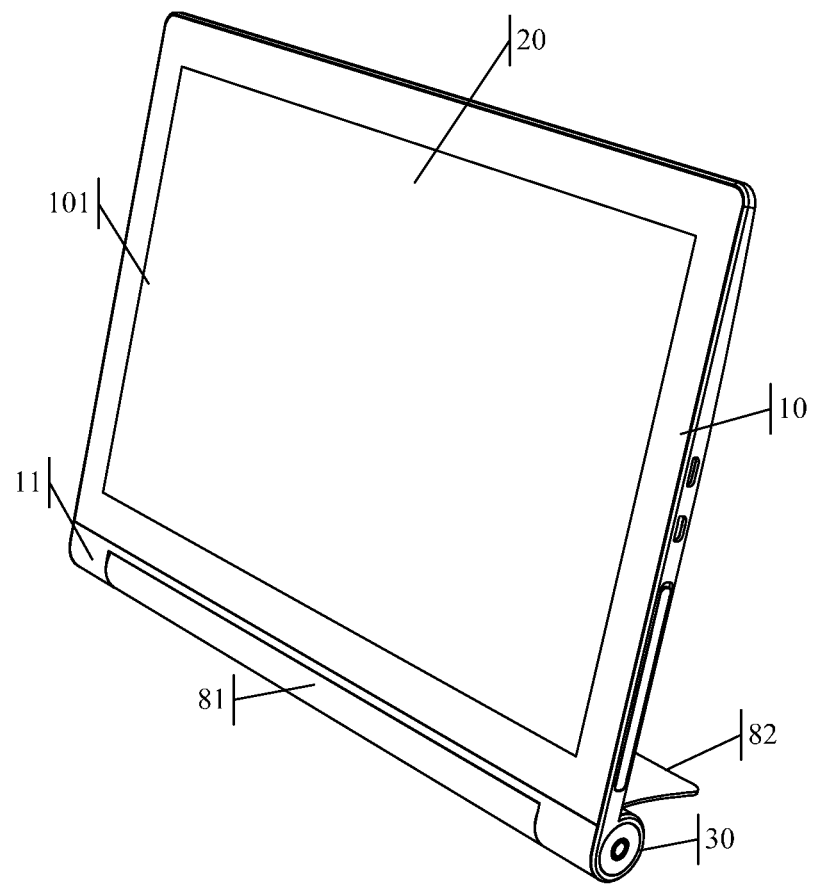
FIG. 1 is a oblique view of an electronic device according to an embodiment of the present disclosure.
Figure 2:
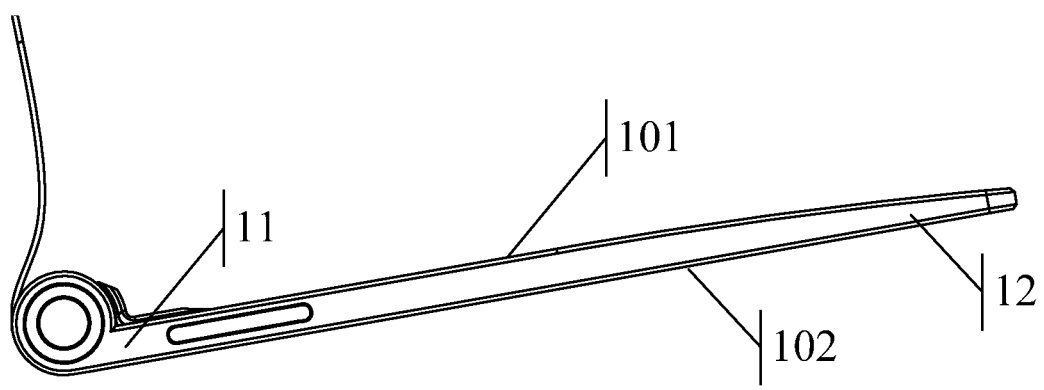
FIG. 2 is a side view of an electronic device according to an embodiment of the present disclosure.

FIGS. 1 and 2 are respectively an oblique view and a side view of an electronic device according to the embodiment of the present disclosure. The embodiment of present disclosure provides an electronic device, including: a first component 10 including a first portion 11 and a second portion 12 opposite to the first portion 11, where the thickness of the first component 10 is gradually decreased from the first portion 11 to the second portion 12; a display unit 20 arranged on a first surface 101 of the first component 10; and a projection component 30 arranged on the first portion 11.

In practice, in the case that the electronic device is a tablet laptop, the first component 10 is the main body of the tablet computer and the display unit 20 is the display screen of the tablet computer. The display unit 20 may be a ordinary LED display screen, a touch display screen, a flexible screen, or the like which is not limited in the present disclosure, as long as the display screen has a display function. The body of the tablet computer is wedge-shaped, that is, one side of the body is thinner while the other side is thicker. The first portion 11 corresponds to the thicker side, the second portion 12 corresponds to the thinner side, and the projection component 30 is arranged on an end lateral surface of the thicker side.

At least one function component is arranged in the first component 10 of the electronic device, and the at least one function component is arranged at a location closer to the first portion 11 to decrease the thickness of the first component 10 gradually from the first portion 11 to the second portion 12.

Since the body of the electronic device is wedge-shaped, in order to decrease the thickness of the second portion 12, the at least one function component arranged in the first component 10, for example, a component occupying a large space, such as a main board, a CPU, a camera module, a speaker, a voice card and a video card and so on, is arranged at the location closer to the first portion 11. In this way, the thickness of the first component 10 is decreased gradually from the first portion 11 to the second portion 12.

Further, the electronic device further includes a second component arranged on the first portion 11. The second component includes a connecting shaft 81 and a support 82 which is movable with respect to the first component 10 via the connecting shaft 81. And the support 82 can be used to support the first component 10 when being moved to a first relative location with respect to the first component 10.

Figure 3A:
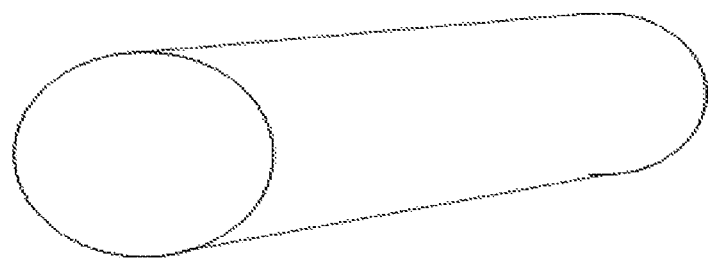
FIGS. 3A to 3B are structural diagrams of a connecting shaft according to an embodiment of the present disclosure.
Figure 3B:
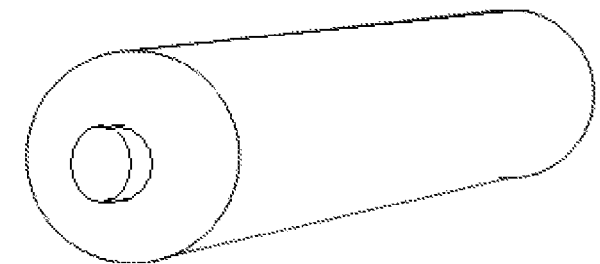

In practice, the second component is arranged on the thicker side of the electronic device. The connecting shaft 81 may be a rotating shaft as shown in FIG. 3A, or may be composed of multiple concentric rotating shafts with different diameters as shown in FIG. 3B. The support 82 may be formed integrally with the connecting shaft 81, or may be sleeved on the connecting shaft 81. The support 82 is fixed to the connecting shaft 81, that is, a motion of the connecting shaft 81 may drive the support 82 to move. In order to keep the support 82 at the first relative location to support the first component 10 when the support 82 is moved to the first relative location with respect to the first component 10, the connecting shaft 81 may be a damping rotating shaft. In this case, the support 82 may stay at any location to support the first component 10. Of course, the above supporting process may also be implemented by manufacturing the inner surface of the support 82, via which the support 82 cooperates with connecting shaft 81 for rotating, with a damping material. And in addition to the above two ways, the above supporting process may also be implemented in other ways which is not limited in the present disclosure.

In the embodiment of the present disclosure, any one or more input/output devices such as a sound box, a camera, a button, an indicator light, a USB interface may be arranged on the first component 10, in addition to the display unit 20 arranged on the first surface 101 of the first component 10. For example, the camera is arranged on the edge of the display unit 20 on the first surface 101, and in practice, two cameras may be arranged, with one being arranged on the first surface 101 and the other being arranged on a second surface opposite to the first surface 101. Specific locations of the sound box, the button, the indicator light and the USB interface may be set by those skilled in the art as needed, and will not be enumerated one by one and limited in the present disclosure.

There are multiple modes of the electronic device according to the embodiments of the present disclosure. In the case that the electronic device is in a standing mode, i.e. the body stands on a flat surface and is supported by both the support 82 and the first portion 11. In this case, the electronic device may stand more steadily, since the body is wedge-shaped, the thicker first portion 11 acts as an undersurface and cooperates with the support 82. Also, the first portion 11 further includes a function component such as a projection module 30 and a video card, so that the center of gravity of the first component 10 is moved lower, and the first component 10 may stand steadily when the electronic device is in the standing mode.

An embodiment of the present disclosure provides an electronic device, including: a first component 10 which includes a first portion 11 and a second portion 12 opposite to the first portion 11, with a cavity being arranged in the first portion 11; a display unit 20 arranged on a first surface 101 of the first component 10; a projection component 30 arranged in the cavity; and a battery module arranged in the cavity.

In practice, in the case that the electronic device is a tablet laptop, still referring to FIGS. 1 and 2, the first component 10 is the main body of the tablet computer and the display unit 20 is the display screen of the tablet computer. The display unit 20 may be a ordinary LED display screen, a touch display screen, a flexible screen, or the like which is not limited in the present disclosure, as long as the display screen has a display function. Specifically, the thickness of the first component of the electronic device is gradually decreased from the first portion to the second portion, since the body of the tablet computer is wedge-shaped, that is, one side of the body is thinner while the other side is thicker. The first portion 11 corresponds to the thicker side and the second portion 12 corresponds to the thinner side. A cavity is arranged in the thicker first portion 11, in which both the projection component 30 and the battery module are arranged. Of course, the cavity may also be used to contain, for example, lines on the main board or function modules occupying a larger space, which is not limited in the present disclosure.

The electronic device according to the embodiment of the present disclosure further includes a second component arranged on the first portion 11 of the first component 10. The second component includes a connecting shaft 81 and a support 82. The support 82 is movable with respect to the first component 10 via the connecting shaft 81. And the support 82 is capable of supporting the first component 10 when being moved to a first relative location with respect to the first component 10.

In practice, the second component is arranged on the thicker side of the electronic device. The connecting shaft 81 may be a rotating shaft as shown in FIG. 3A, or may be composed of multiple concentric rotating shafts with different diameters as shown in FIG. 3B. The support 82 may be formed integrally with the connecting shaft 81, or may be sleeved on the connecting shaft 81. The support 82 is fixed to the connecting shaft 81, that is, a motion of the connecting shaft 81 may drive the support 82 to move. In order to keep the support 82 at a first relative location to support the first component 10 when the support 82 is moved to the first relative location with respect to the first component 10, the connecting shaft 81 may be a damping rotating shaft. In this case, the support 82 may stay at any location to support the first component 10. Of course, the above supporting process may also be implemented by manufacturing the inner surface of the support 82, via which the support 82 cooperates with the connecting shaft 81 for rotating, with a damping material. And in addition to the above two ways, the above supporting process may also be implemented in other ways which is not limited in the present disclosure.

A cavity is arranged inside the first portion 11 of the electronic device according to the embodiment of the present disclosure, for containing the battery, the projection component 30, or other components. If the cavity is specifically to contain the battery module, the battery module is specifically a columnar battery which is placed coaxially with the projection module 30 in the cavity, i.e. the center of the columnar battery is the same as the center of the projection module 30. For example, if both the columnar battery and the projection module 30 are cylinders, the columnar battery and the projection module 30 are arranged in a shape similar with a concentric circle. Of course, the columnar battery and the projection module 30 are still arranged in a concentric shape in the case that the shapes of the battery module and the projection module 30 are cuboids.

An embodiment of the present disclosure provides an electronic device, including: a first component 10 which includes a display unit 20 arranged on a first surface 101 of the first component 10; a second component which includes a connecting shaft 81 and a support 82 and is arranged on the first portion 11 of the first component, where the connecting shaft 81 including a cavity; and a projection component 30 arranged in the cavity. The support 82 is movable with respect to the first component 10 via the connecting shaft 81. And the support 82 supports the first component 10 when being moved to a first relative location with respect to the first component 10.

The electronic device according to the embodiment of the present disclosure further includes: a first sub-connecting portion arranged on a first end portion 111 of the first portion 11; and a second sub-connecting portion arranged on a second end portion 112 of the first portion 11. The first and second sub-connecting portions are respectively sleeved on the connecting shaft 81. And the connecting shaft 81 is capable of rotating inside the first and second sub-connecting portions, so as to drive the support 82 to move with respect to the first component 10.

In practice, still referring to FIGS. 1 and 2, in the case that the electronic device is specific a tablet laptop, the first component 10 is the main body of the tablet computer and the display unit 20 is a display screen of the tablet computer. The display unit 20 may be a ordinary LED display screen, a touch display screen, a flexible screen, or the like which is not limited in the present disclosure, as long as the display screen has a display function.

The second component is arranged on the first portion 11 of the electronic device. The connecting shaft 81 may be a rotating shaft as shown in FIG. 3A, or may be composed of multiple concentric rotating shafts with different diameters as shown in FIG. 3B. The support 82 may be formed integrally with the connecting shaft 81, or may be sleeved on the connecting shaft 81. The support 82 is fixed to the connecting shaft 81, that is, a motion of the connecting shaft 81 may drive the support 82 to move. In order to keep the support 82 at a first relative location to support the first component 10 when the support 82 is moved to the first relative location with respect to the first component 10, the connecting shaft 81 may be a damping rotating shaft. In this case, the support 82 may stay at any location to support the first component 10. Of course, the above supporting process may also be implemented by manufacturing the inner surface of the support 82 via which the support 82 cooperates with the connecting shaft 81 for rotating, with a damping material. And in addition to the above two ways, the above supporting process may also be implemented in other ways which is not limited in the present disclosure. A cavity is arranged inside the connecting shaft 81 for containing modules such as the projection module 30 of the electronic device.

Figure 4:
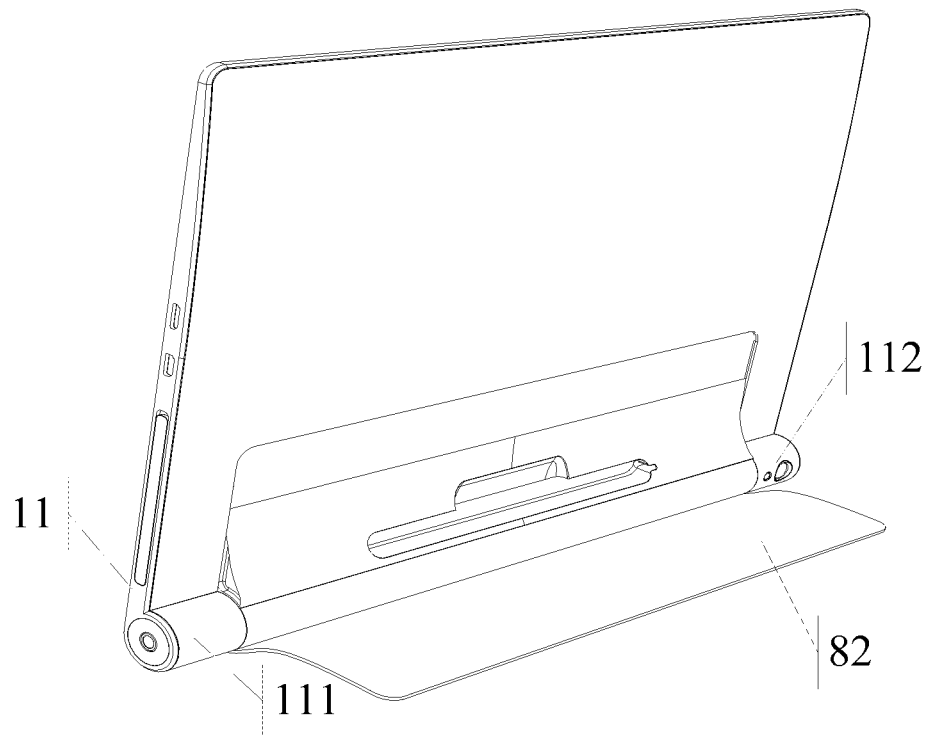
FIG. 4 is a back view of an electronic device according to an embodiment of the present disclosure.
Figure 5:
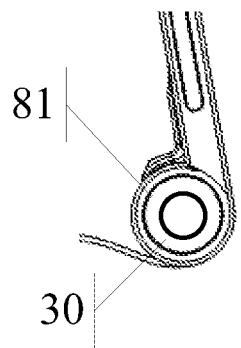
FIG. 5 is a side view of a first end portion according to an embodiment of the present disclosure.

Further, as shown in FIG. 4, the first sub-connecting portion of the first end portion 111 and the second sub-connecting portion of the second end portion 112 may be through-holes or chambers. In the case that the first and second sub-connecting portions are through-holes, two ends of the connecting shaft 81 pass through respectively through the first and second sub-connecting portions, so that end surfaces of the two ends of the connecting shaft 81 are exposed. In this case, as the side view of the first end portion 111 shown in FIG. 5, the projection component 30 is arranged on the end surface of one end of the connecting shaft 81. Of course, other components may also be arranged on the other end surface of the connecting shaft 81.

The first component 10 of the electronic device according to the embodiment of the present disclosure further includes a second surface 102 opposite to the first surface 101, on which at least one input/output component is arranged.

In practice, still taking the above tablet computer as an example, the second surface 102 is a backboard of the tablet computer. Based on different design requirements, an input/output apparatus such as a camera or a subwoofer may be arranged on the backboard of the tablet computer. In order to contain the support 82, a first groove may be provided on the second surface 102, so that the support 82 and the second surface 102 form an entire plane when the support 82 is completely imbedded in the first groove. Further, other grooves may also be arranged at the bottom of the first groove, for containing a smart card and/or a stylus to realize a communication function or a storage function, such as a stylus, a Subscriber Identity Module card (SIM card), a Secure Digital card (SD card) or a memory stick and so on.

An embodiment of the present disclosure provides an electronic device, including: a first component 10 which includes a first portion 11 and a second portion 12 opposite to the first portion 11; a second component which includes a connecting shaft 81 and a support 82 and is arranged on the first portion 11; a display unit 20 arranged on a first surface 101 of the first component 10; and a projection component 30 arranged on the first portion 11. In the case that the support 82 is moved to a first relative location with respect to the first component 10 via the connecting shaft 81 and the electronic device is in a touch mode in which the electronic device is supported on a flat surface by both the support 82 and the second portion 12, a first distance between the projection component 30 and the flat surface is changed as the support 82 is rotated.

Further, the connecting shaft 81 is a damping rotating shaft, so that the support 82 is kept at a first relative location when being rotated about the connecting shaft 81 to the first relative location with respect to the first component 10.

In practice, still referring to FIGS. 1 and 2, in the case that the electronic device is a tablet laptop, the first component 10 is the main body of the tablet computer and the display unit 20 is a display screen of the tablet computer. The display unit 20 may be a ordinary LED display screen, a touch display screen, a flexible screen, or the like which is not limited in the present disclosure, as long as the display screen has a display function.

The second component is arranged on the first portion 11 of the electronic device. The connecting shaft 81 may be a rotating shaft, or may be composed of multiple concentric rotating shafts with different diameters. The support 82 may be formed integrally with the connecting shaft 81, or may be sleeved on the connecting shaft 81. The support 82 is fixed to the connecting shaft 81, that is, a motion of the connecting shaft 81 may drive the support 82 to move. In order to keep the support 82 at the first relative location to support the first component 10 when the support 82 is moved to the first relative location with respect to the first component 10, the connecting shaft 81 may be a damping rotating shaft. In this case, the support 82 may stay at any location to support the first component 10. Of course, the above supporting process may also be implemented by manufacturing the inner surface of the support 82, via which the support 82 cooperates with the connecting shaft 81 for rotating, with a damping material. And in addition to the above two ways, the supporting process may also be implemented in other ways which is not limited in the present disclosure. A cavity is arranged inside the connecting shaft 81 for containing modules such as the projection module 30 of the electronic device.

The electronic device according to the embodiments has but is not limited to three types of using modes as follows.

Figure 6A:
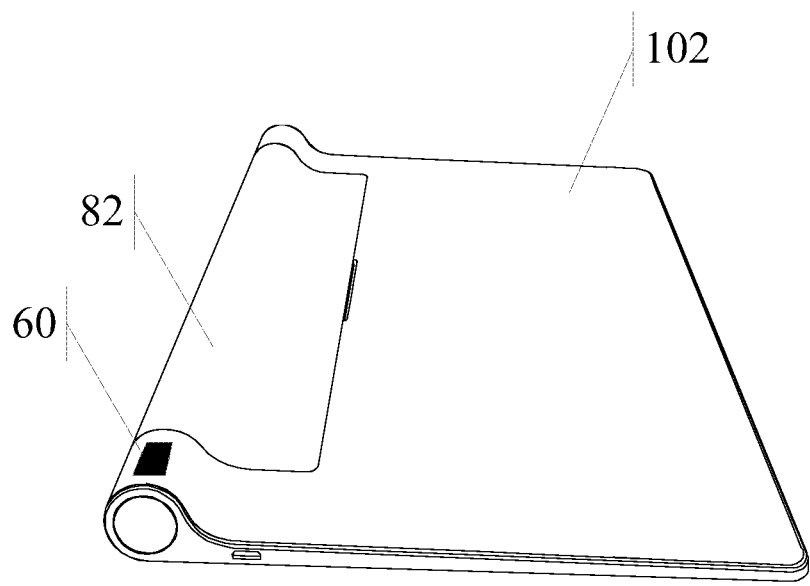
FIG. 6A is a schematic diagram of an electronic device when the electronic device is in a panel-mode according to a fourth embodiment of the present disclosure.

A first type is a panel-mode, or a tablet mode. As shown in FIG. 6A, under the panel-mode, the support 82 is imbedded into the first groove arranged on the second surface 102 and forms an entire plane with the second surface 102. In this case, a user may handle the electronic device or place the electronic device on a plane as using a ordinary tablet computer. Both the first portion 11 and the second portion 12 of the first component 10 support the first component when the electronic device is placed on the plane.

Figure 6B:
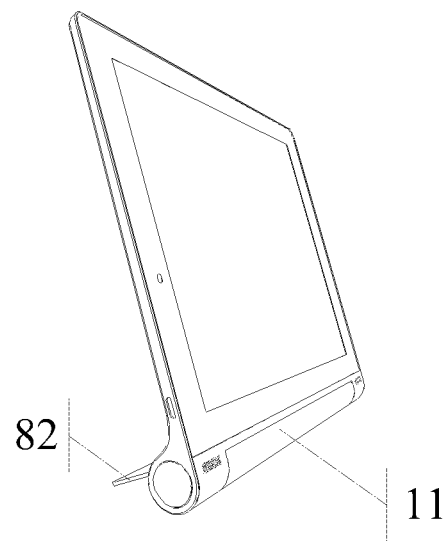
FIG. 6B is a schematic diagram of an electronic device when the electronic device is in a standing mode according to the fourth embodiment of the present disclosure.

A second mode is a standing mode. As shown in FIG. 6B, the user only rotates the support 82 out of the first groove if the user wants to switch the electronic device from the panel-mode to the standing mode. By rotating the connecting shaft 81, the support 82 is driven to rotate to a first relative location with an angel such as 50 degrees between the first component 10 and the support 82, and the first component 10 and the support 82 are kept staying at the first relative location for the damping function of the connecting shaft 81. In this case, the electronic device is in the standing mode and the first component 10 is supported by the support 82 and the first portion 11. Further, the user may further adjust the angle between the support 82 and the first component 10 as needed, so as to improve a user experience. Under the standing mode, the user may watch a video, browse webpages, or the like by using the electronic device.

Figure 6C:
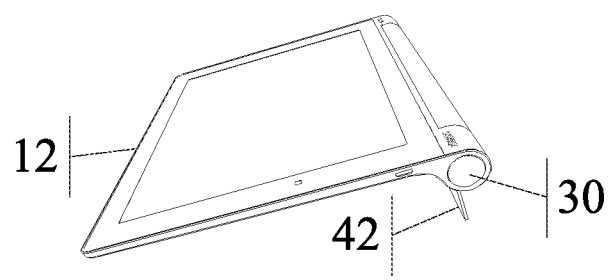
FIG. 6C is a schematic diagram of an electronic device when the electronic device is in a touch mode according to the fourth embodiment of the present disclosure.

A third type is a touch mode. As shown in FIG. 6C, the user may type on a virtual keyboard of the electronic device with two hands to improve the input efficiency if the user wants to edit a document or input words with the electronic device. In this case, the user may place the first portion 11 of the first component 10 at a location away from the user and place the second portion 12 at a location close to the user, and the first component 10 is supported by the support 82 and the second portion 12. Further, the electronic device may adjust a display direction of the display unit 20 based on the state which it is in, so that it is convenient for the user to input. Of course, when the electronic device is in the touch mode, the user may not be inputting, but may be playing games, such as playing a piano, by clicking the keyboard with two hands. And the electronic device may be in the input mode if only the user operates the electronic device with both two hands.

In the case that a projection mode is started under the touch mode, a current display content of the display unit 20 may be projected, and the projected content may be operated correspondingly when the display content is operated. For example, in the case that a projection function of a tablet computer is used in a conference, the support 82 of the tablet computer is rotated to an appropriate angle such as 60 degrees, so that the tablet computer is supported by both the support 82 and the second portion 12 and the display unit 20 is placed in a form of facing to the user. In this case, if the set angle, 60 degrees, make the height of the projection too high or too low, the height of the projection may be adjusted by changing the angle between the support 82 and the second surface 102, that is, a first distance is gradually reduced as the angle between the support 82 and the second surface 102 is gradually reduced; and the first distance is gradually increased as the angle between the support 82 and the second surface 102 is gradually increased.

The electronic device according to the embodiment further includes a focusing structure 60 arranged on a surface region located on the first sub-connecting portion of the first end portion 111 of the first portion 11 as shown in FIG. 6A. The focusing structure 60 may be arranged on a surface region on the same side with the first surface 101 on the first sub-connecting portion, on a surface region on the same side with the second surface 102 on the first sub-connecting portion, or on other regions, which is not limited herein. The focal length of a lens of the projection component 30 may be adjusted by operating the focusing structure 60. Still taking the projection function of the tablet computer used in the conference above, if the tablet computer is in the touch mode, the user may adjust the focal length of the projection lens by adjusting the focusing structure 60, to obtain a clearer projection content. The focusing structure may be a slide block gear, a rotating gear, or the like, which is not limited herein, as long as the component makes the lens moved forwards or backwards.

In the case that the projection function is used under the touch mode, the speaker in the conference may label on the display unit 20 at any moment and the labels are displayed on the projection in real time, so that the interaction between the speaker and participants is improved. For example, in order to enable the participants to understand a certain abstract concept more easily, the speaker may write a label or draw on the display screen to explain in detail when the concept is spoken about, and the above labels or diagrams may be displayed on the projection content at the same time, so that the experience of the user of the electronic device is further improved.

The body of the electronic device provided in the technical solutions according to the embodiments of the present disclosure is wedge-shaped, that is, one side of the body is thinner while the other side is thicker. A rotatable support capable of supporting the body is arranged on the thicker side of the body and a projection component is arranged on the thicker side of the body. In practice, the height of the electronic device may be adjusted by only rotating the support, so that the projection height is adjusted. It can be seen that, the technical solutions according to the embodiments of the present disclosure solve the technical problem that the electronic device in the conventional technologies can not adjust the projection height by utilizing the structure design of the electronic device itself, and achieve a technical effect that the electronic device adjusts the projection height by utilizing the structure design of the electronic device itself.

According to the technical solutions of the embodiments of the present disclosure, a cavity is arranged on one side of the body of the electronic device, and a battery and a projection component are coaxially placed in the cavity. So that a space of the electronic device is reused effectively instead of designing a separate space for the projection component in the conventional technologies, hence the cost of product is reduced. Therefore, it is achieved a technical effect that the cost of product is reduced by effectively reusing the space, according to the technical solutions of the embodiments of the present disclosure According to the technical solutions of the embodiments of the present disclosure, the weight of the side of the connecting shaft of the electronic device is increased because a cavity structure is arranged in the connecting shaft of the electronic device and the projection component is placed in the cavity. Hence it is achieved a technical effect that the center of gravity of the electronic device is moved lower and the support arranged on the connecting shaft can support the electronic device more steadily.

According to the technical solutions of the embodiments of the present disclosure, when the electronic device is in a touch mode, that is, when the electronic device is supported on a flat surface by both the support and the second portion of the electronic device, the display unit of the electronic device is placed upwardly to facilitate a user's operation. Moreover, a projection content may be operated by correspondingly operating a current display content of the display unit, for example, an important content is displayed in highlight. In this way, the experience of user is improved greatly.

An electronic device is provided according to the embodiments of the disclosure, which further solves the technical problem in the conventional technology that a support blocks a rear camera or a subwoofer in a tablet computer, thereby achieving a technical effect that the support does not block the rear camera or the subwoofer in the tablet computer.

An electronic device is provided according to the disclosure, the electronic device includes: a first component including a display unit, where the display unit is arranged on a first surface of the first component; a second component including a connecting shaft and a support, where the second component is arranged at a first portion of the first component, and the support is provided with a hole; at least one input/output component arranged on a second surface of the first component opposite to the first surface; where the support is movable relative to the first component via the connecting shaft, and the at least one input/output component is arranged inside the hole in the case that the support is closely against the second surface.

Figure 7:
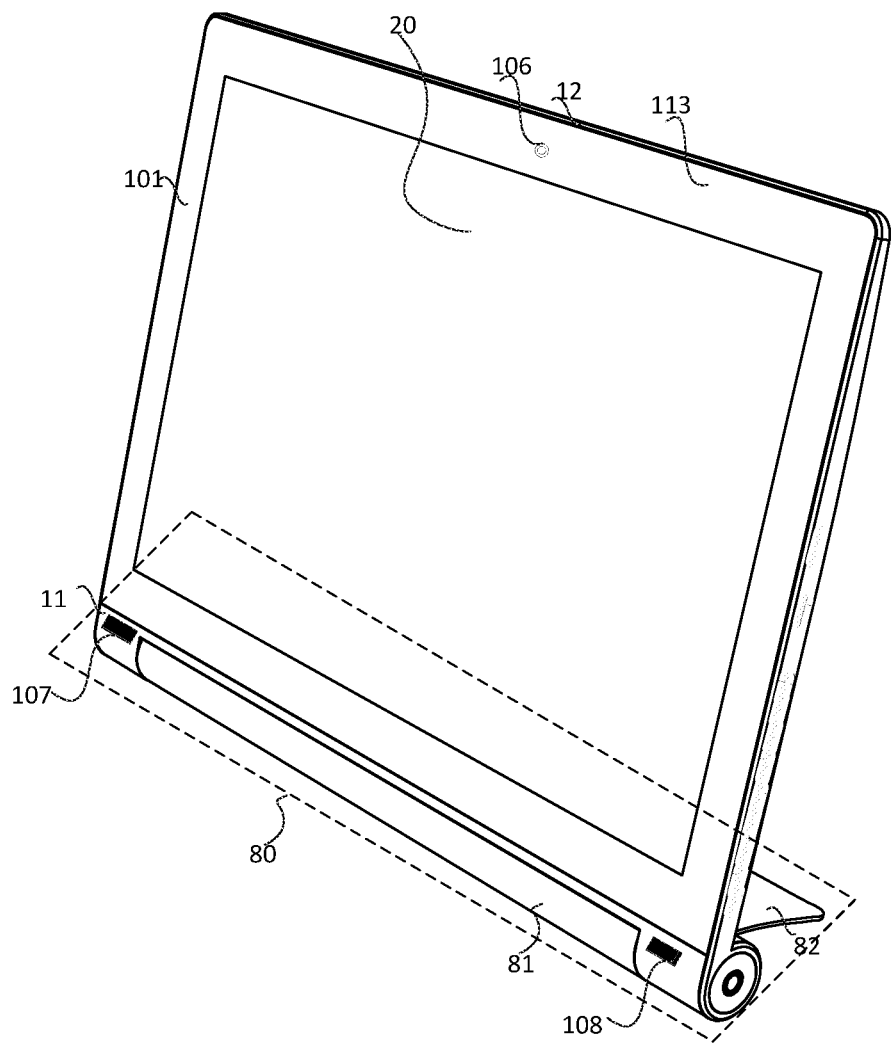
FIG. 7 is a schematic structural profile of an electronic device according to an embodiment of the disclosure.

FIG. 7 shows a schematic structural diagram of an electronic device according to an embodiment of the disclosure. In practice, the electronic device may be a tablet device, for example a tablet computer, a smart phone and a multimedia player, or other electronic devices, which are not listed one by one here. In the following specific description, it is illustrated by assuming that the electronic device is a tablet computer for example.

An electronic device, which includes: a first component 10 including a display unit 20, where the display unit 20 is arranged on a first surface 101 of the first component; a second component 80 including a connecting shaft 81 and a support 82, where the second component 80 is arranged at a first portion 11 of the first component 10, and a hole 105 is provided on the support 82; at least one input/output component 40 arranged on a second surface 102 of the first component 10 opposite to the first surface 101; where the support 82 is movable relative to the first component 10 via the connecting shaft 81, and the at least one input/output component 40 is arranged inside the hole 105, in the case that the support 82 is closely against the second surface 102.

In the embodiment of the disclosure, the first portion 11 is a lateral portion of a side via which the first component 10 contacts with a supporting surface for example a desktop, in the case that a user normally uses the electronic device, i.e., the display unit 20 faces toward the user. The display unit may be a ordinary LED display screen, a touch display screen, a flexible screen or other display screens including a display function, which are not listed one by one here. The user may browse a web page, watch news, see a movie and receive/send an e-mail on the display unit. In addition, the first component 10 further includes a second surface 102, i.e., a surface opposite to the display screen; and the first component 10 includes a second portion 12 opposite to the first portion 11.

The at least one input/output component 40 which may be a subwoofer 41 and/or a rear camera 42 is arranged inside the hole 105 in the case that the support 82 is closely against the second surface 102.

For the convenient use of the user, in the embodiment of the disclosure, the electronic device is switched to a suspending mode via the hole 105 in the case that the support 82 is away from the second surface 102, and an angle between the support 82 and the first component 10 is greater than or equal to a preset angle when the support 82 moves relative to the first component 10.

Figure 8:
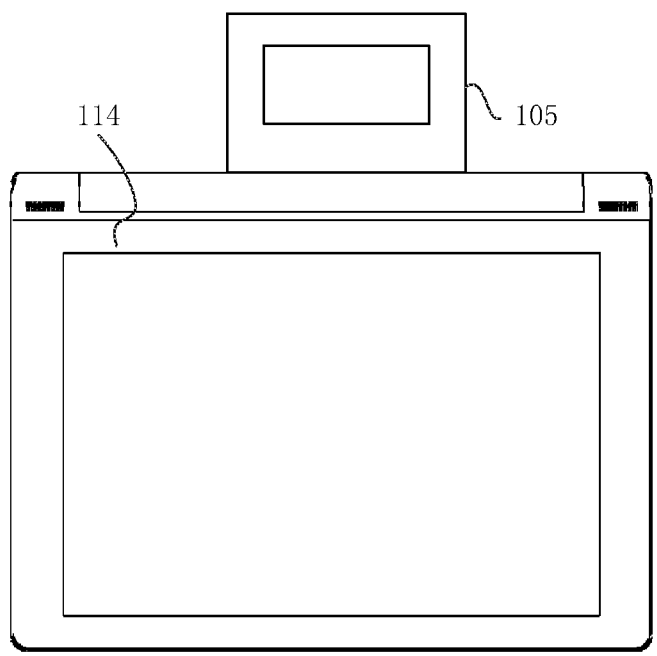
FIG. 8 is a schematic diagram of the electronic device in a suspending mode according to an embodiment of the disclosure.

Referring to FIG. 8, in a specific implementing process, the hole 105 may be a square hole, a circular hole, a diamond hole or a hole with other shapes, which are not listed one by one here. It is illustrated here by taking the square hole as an example. In the case that the angle between the support 82 and the first component 10 is 180 degrees when the support 82 is rotated to move relative to the first component 10, the user suspends the support 82 on a plane for example a wall surface via the hole 105, and the electronic device changes a display direction of the display unit 20 based on a current posture of the electronic device. For example, in the case that the support 82 supports the first component 10, the display unit 20 displays in a direction from the second portion 12 to the first portion 11; and in the case that the electronic device is suspended on the wall via the hole 105, the display unit 20 displays in a direction from the first portion 11 to the second portion 12.

Figure 9:
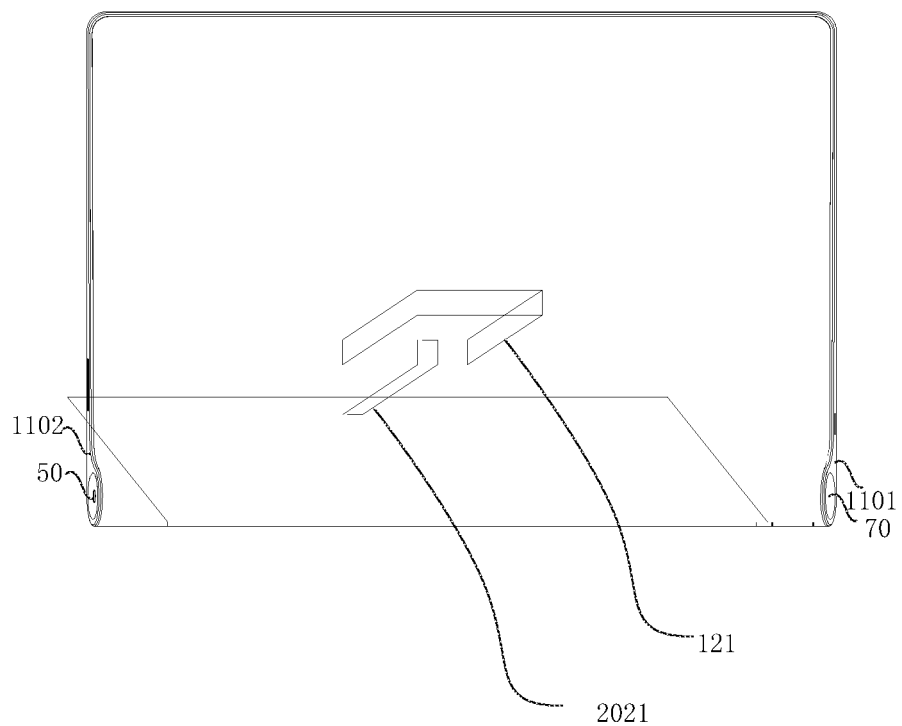
FIG. 9 is a schematic structural diagram of a retaining groove and a retaining snap of the electronic device according to an embodiment of the disclosure.
Figure 10:
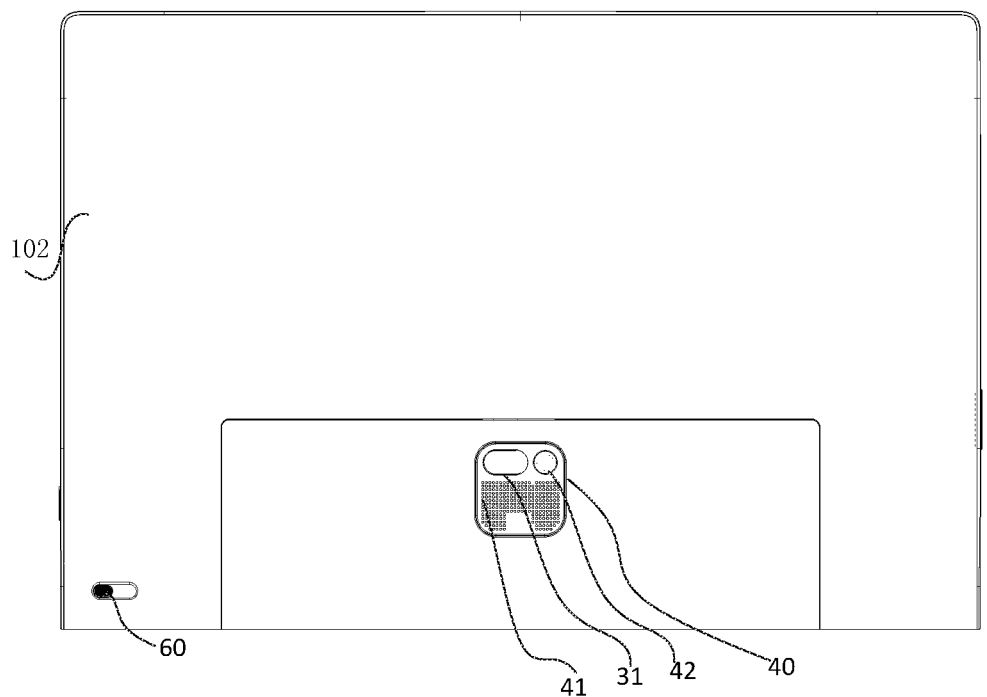
FIG. 10 is a schematic structural diagram of a second surface of the electronic device according to the an embodiment of the disclosure.
Figure 11:
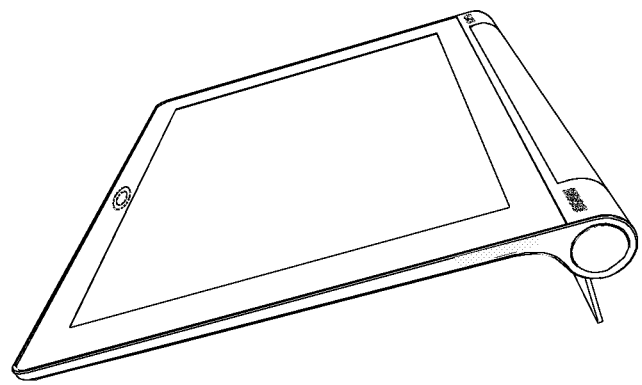
FIG. 11 is a schematic diagram of the electronic device in an input mode according to an embodiment of the disclosure.

Furthermore, in order to make the user use the electronic device more conveniently, in the embodiment of the disclosure, a retaining groove 121 is provided in a hole-corresponding-region of the second surface 102 corresponding to the hole 105, and a retaining snap 2021 is provided at a place on the support 82 corresponding to the retaining groove 121, as shown in FIG. 9. In the case that the retaining snap 2021 is clamped into the retaining groove 121, the support 82 overlaps with the second surface 102.

A starting button 31 is also provided in the hole-corresponding-region, and a separating element is provided on the starting button 31. In the case that the support 82 overlaps with the second surface 102 and a pressure is applied to the starting button 31, the separating element is pushed to squeeze the retaining snap 2021, such that the retaining snap 2021 is separated from the retaining groove 121, and thus the support 82 is departed from the second surface 102.

In practice, a shape of the starting button 31 may be a strip shaped, circular, elliptical or other shapes. In addition, the starting button may be made of a plastic material, a metal material or other materials, which are not listed one by one here. In the embodiment of the disclosure, it is illustrated by taking an elliptical starting button made of the metal material as an example. Once the user presses down the starting button 31, the separating element provided on the starting button 31 squeezes the retaining snap 2021 for the external force applied by the user, such that the retaining snap 2021 is separated from the retaining groove 121, and thus the support 82 is departed from the second surface 102.

In the embodiment of the disclosure, in order to project using the electronic device by the user, the electronic device further includes a projection component 30 arranged at a first end lateral portion 1102 of the first portion 111.

In the embodiment of the disclosure, in order to focus the projection component 30 by the user, the electronic device further includes: a focusing structure 60 and a transmission structure connected to a projection lens of the projection component 30. The focusing structure 60 is connected to the transmission structure and arranged on a surface of the first component 10. Once the focusing structure 60 is operated to move, the transmission structure is driven to drive the projection lens to zoom in or out, thus the focal length of the projection lens is adjusted.

In the embodiment of the disclosure, in the case that the user uses the projection component 30, the height of the projection component 30 needs to be adjusted if the height of the projection component 30 is not suitable. The height of the projection component may be adjusted by the following way: firstly, the support 82 is rotated to move relative to the first component 10 via the connecting shaft 81; in the case that an angle between the support 82 and the first component 10 changes when the support 82 moves relative to the first component, for example 30 degrees, 50 degrees or 70 degrees, the relative height of the projection component 30 changes as different angles between the support 82 and the first component 10, thus the height of the projection component 30 is adjusted.

Furthermore, when the height of the projection component 30 is adjusted, the projection lens of the projection component 30 may also need to be adjusted, In the embodiment of the disclosure, in the case that a projection from the projection component 30 is not clear, the focal length of the projection component needs to be adjusted. Specifically, firstly the focusing structure 60 is operated to move around to drive the transmission structure connected with the focusing structure 60 to move around too, the projection lens is driven to zoom in or out, thus the focal length of the projection lens is adjusted.

In the embodiment of the disclosure, in order to move a center of gravity of the first component 10 lower, such that the support 82 supports the first component 10 more stably, the first component 10 further includes a second portion 12 opposite to the first portion 11. From the first portion 11 to the second portion 12, the thickness of the first component 10 tends to decrease, that is to say, the thickness of the first component 10 gradually decreases from bottom to top, and the first component 10 is wedge-shaped.

In order to make the user turn on or turn off the electronic device conveniently, the electronic device in the embodiment of the disclosure further includes a power button 70 arranged at a second end lateral portion 1101 of the first portion 11 opposite to the first end lateral portion 1102.

Furthermore, in order to meet the entertaining demand of the user, the electronic device further includes a front camera arranged in a first upper marginal region 113 of the first surface 101, which is above the display unit. As shown in FIG. 7, the first component 10 is provided with a front camera 106. In order to enable the user to photo himself conveniently, the front camera 106 is arranged on the first surface 101 of the first component 10. Since there are many function components on the first portion 11 of the first component 10, the front camera is arranged in the first upper marginal region 113 of the first surface 101. The specific position in the first upper marginal region 113 where the front camera is arranged is not limited, preferably, the front camera is arranged at a middle position of the first upper marginal region 113 for convenience of the user to use.

Furthermore, in order to increase entertaining functions of the electronic device, the electronic device further includes a first front loudspeaker 107 and a second front loudspeaker 108, as shown in FIG. 7. The first front loudspeaker 107 and the second front loudspeaker 108 are arranged on the first surface 101. Preferably, the first front loudspeaker is arranged on the left of a first lower marginal region 114 of the first surface 101, which is below the display unit 20; and the second front loudspeaker is arranged on the right of the first lower marginal region 114, thus a good sound experience is obtained by the user.

In the case that the user wants to see a movie using the electronic device when lying on the bed, the user switches the electronic device from the tablet mode to a suspending mode. The user opens the support 82 by using the starting button, the support 82 rotates relative to the first component 10 until the angle between the support 82 and the first component 10 meets another preset condition, for example 180 degrees, such that the hole 105 on the support 82 passes through a fixed suspender. In this case, as shown in FIG. 8, the support 82 can be suspended via the hole 105, and the user may watch a video by using the electronic device.

According to the technical solutions of the embodiments of the disclosure, a hole is provided on the support of the electronic device, and the support is movable relative to the first component via the connecting shaft; in the case that the support is closely against the second surface, the at least one input/output component for example a rear camera or a subwoofer is arranged inside the hole. Hence the technical problem in the conventional technology that the support blocks the rear camera or the subwoofer in the tablet computer is effectively solved, thereby achieving a technical effect that the support does not block the rear camera or the subwoofer in the tablet computer.

According to the technical solutions of the embodiments of the disclosure, a hole is provided on the support of the electronic device, and the support is movable relative to the first component via the connecting shaft; in the case that the support is closely against the second surface, the at least one input/output component for example a rear camera, is arranged inside the hole. Hence the technical problem in the conventional technology that the rear camera can not work due to being blocked in the tablet computer is effectively solved, thereby achieving a technical effect that the rear camera can work.

According to the technical solutions of the embodiments of the disclosure, a hole is provided on the support of the electronic device, and the support is movable relative to the first component via the connecting shaft; in the case that the support is closely against the second surface, the at least one input/output component, for example a subwoofer, is arranged inside the hole and is not blocked. Hence by utilizing the technical solutions of the embodiments of the disclosure, it's avoided that the subwoofer is influenced on a bass effect due to being blocked, thus the technical problem in the conventional technology that the subwoofer can not work due to being blocked in the tablet computer is effectively solved, and a technical effect that the subwoofer is not influenced is achieved.

According to the technical solutions of the embodiments of the disclosure, a starting button is provided at the hole-corresponding-region, and the starting button is provided with a separating element; in the case that the support overlaps with the second surface and a pressure is applied to the starting button, the separating element is pushed to squeeze the retaining snap, such that the retaining snap is separated from the retaining groove, and thus the support is departed from the second surface; therefore, once the starting button is pressed down, the support is depart from the second surface. Therefore the support overlaps with the second surface or is separated from the second surface easily via the starting button.

According to the technical solutions of the embodiments of the disclosure, the support is movable relative to the first component via the connecting shaft; in the case that the angle between the support and the first component changes when the support moves relatively to the first component, the relative height of the projection component arranged at the first end of the first portion changes, thereby adjusting the height of the projection component, hence achieving a technical effect of adjusting the height of the projection component.

According to the technical solutions of the embodiments of the disclosure, a hole is provided on the support of the electronic device; in the case that the support is departed from the second surface, and the angle between the support and the first component is greater than or equal to a preset angle when the support moves relative to the first component, the electronic device can be suspended via the hole, thereby achieving a technical effect that the electronic device according to the disclosure not only can be supported independently via the structure of the electronic device itself, but also can be suspended via the hold on the support, and greatly improving the user experience.

An electronic device is provided according to the disclosure, to solve a technique problem of the electronic device in the conventional technology that it is difficult to adjust the focal length of projection by utilizing the structure design of the electronic device itself, a focusing button is provided in the internal space of the electronic device, and thus the focal length of projection is adjusted by utilizing the structure design of the electronic device itself.

An electronic device includes: a first component including a first portion and a second portion opposite to the first portion; a display unit arranged on a first surface of the first component; a projection component arranged on the first portion; a transmission structure connected to a projection lens in the projection component; and an adjustment structure connected to the transmission structure and arranged on a surface of the first component; where when the adjustment structure is operated to move, the adjustment structure drives the transmission structure to move and the transmission structure drives the projection lens to zoom in or out, and a focal length of the projection lens is adjusted.

For the above electronic device, the transmission structure is connected to the projection lens in the projection component, and the adjustment structure is connected to the transmission structure. In this case, when the focal length of the projection lens is required to be adjusted, only the adjustment structure is operated to move, the transmission structure connected to the adjustment structure is driven to move, and thus the movement of the transmission structure drives the projection lens to zoom in or out since the transmission structure is connected to the projection lens. Therefore, the technique problem of the electronic device in the conventional technology that it is difficult to adjust the focal length of projection by utilizing the structure design of the electronic device itself is solved, a focusing button is provided in the internal space of the electronic device, and thus the focal length of projection is adjusted by utilizing the structure design of the electronic device itself.

Figure 12:
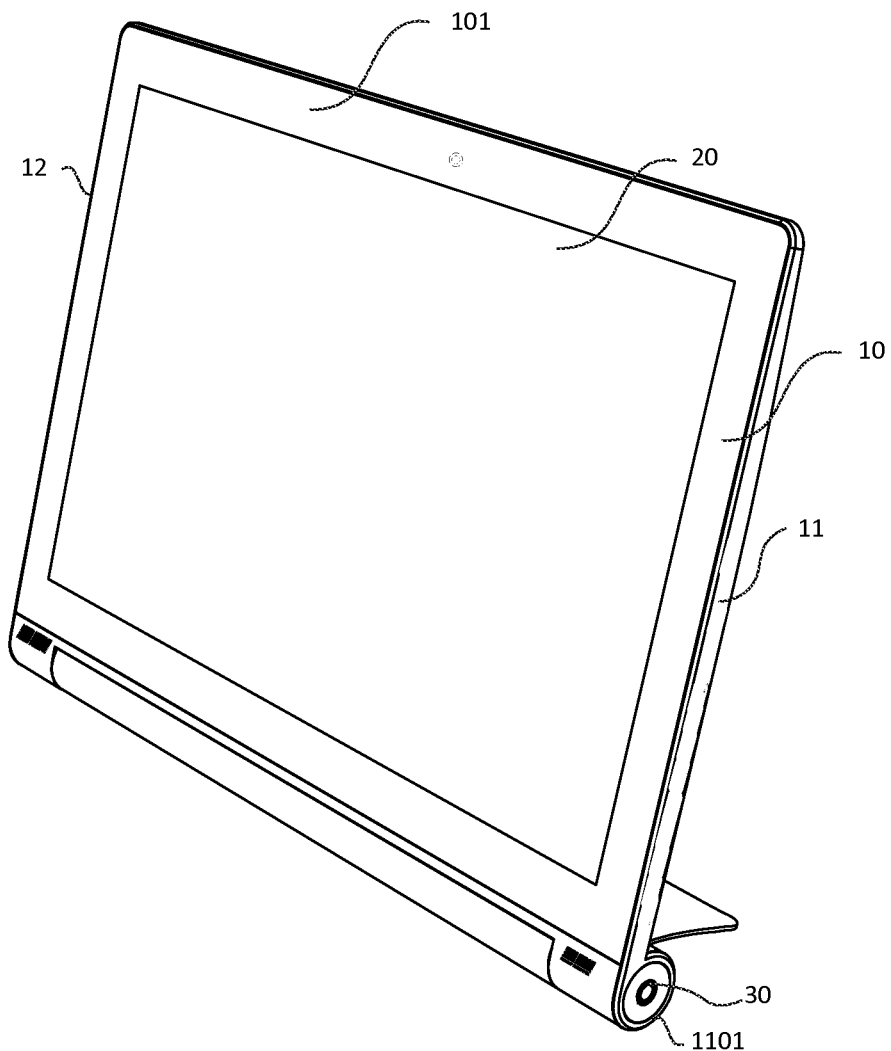
FIG. 12 is a schematic structural diagram of an electronic device according to a first preferred embodiment of the disclosure.
Figure 13:
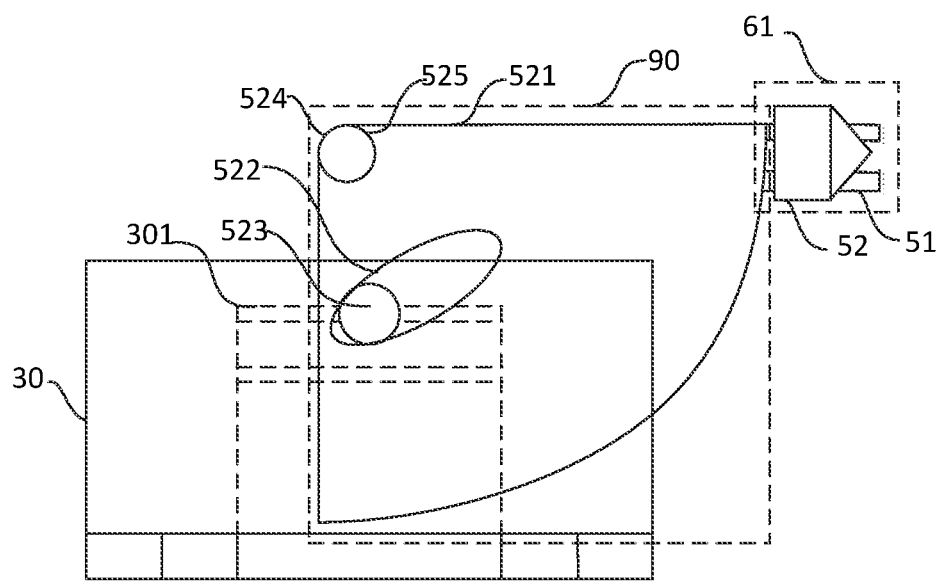
FIG. 13 is an enlarged view of the transmission structure and the adjustment structure of the electronic device shown in FIG. 12.

As shown in FIG. 12 and FIG. 13, FIG. 12 is a schematic structural diagram of an electronic device according to an embodiment of the disclosure and FIG. 13 is a internal schematic structural diagram of the transmission structure and the adjustment structure of the electronic device according to an embodiment. In practice, the electronic device may be a table device such as a tablet computer, a smart phone, a multimedia player, which is not recited one by one herein. In the following detailed description, the electronic device being a tablet computer is taken as an example for illustration.

The electronic device includes: a first component 10 including a first portion 11 and a second portion 12 opposite to the first portion; a display unit 20 arranged on a first surface 101 of the first component 10; a projection component 30 arranged on a third end lateral portion 1103 of the first portion 11; a transmission structure 90 connected to a projection lens 301 in the projection component 30; and an adjustment structure 61 connected to the transmission structure 90 and arranged on a surface of the first component 10; where the adjustment structure 61 drives the transmission structure 90 to move when being operated to move, the transmission structure 90 drives the projection lens 301 to zoom in or out, and the focal length of the projection lens 301 is adjusted.

Figure 14:
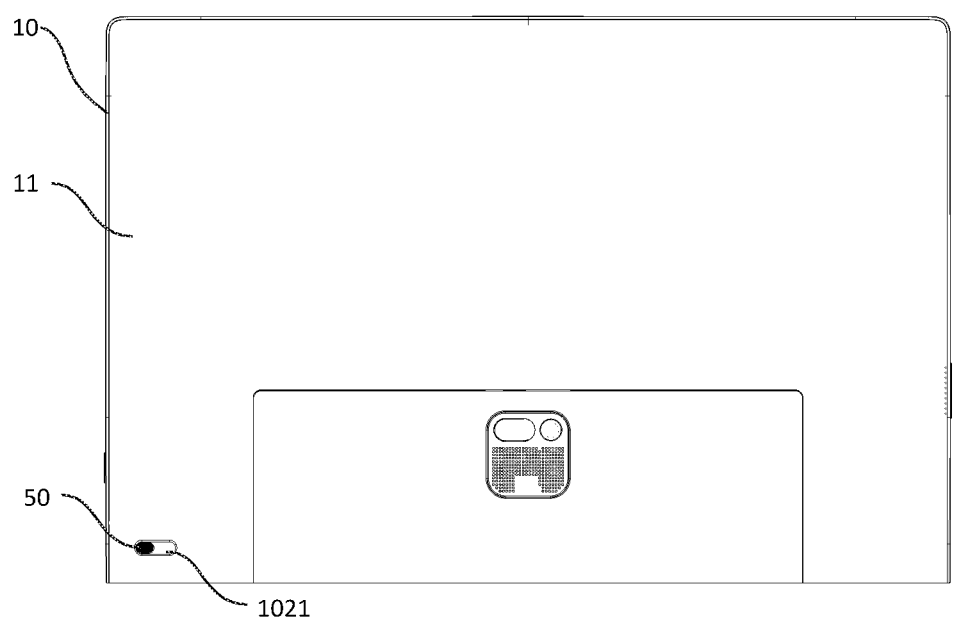
FIG. 14 is a schematic structural diagram of the second surface of the electronic device shown in FIG. 12

In practice, in the case that the electronic device is a tablet computer, an elongated hole 1021 is provided on a second surface region of a second surface 102 of the first component 10 corresponding to the adjustment structure 61, and the second surface 102 of the first component 10 is opposite to the first surface 101, as shown in FIG. 14. The first component 10 is the main body of the tablet computer. The main hardware of the tablet computer may be arranged on or inside the main body, for example, a display unit 20 is arranged on the first surface 101 of the first component 10. In practice, the display unit 20 is embedded into the first surface 101 of the first component 10. In the embodiment of the disclosure, the display unit 20 may be an ordinary LED display screen, or a touch display screen, or a flexible screen, as long as the display function is provided, which is not specifically limited in the disclosure. The user may browse web, review news, see a film or send and receive an email on the display unit 20.

In the embodiment of the disclosure, besides the display unit 20 arranged on the first surface 101 of the first component 10, a speaker, a camera, a turn on power button, a indicator light or an USB interface and so on may further be arranged on the first component 10. For example, a camera is arranged on the edge of the display unit 20 on the first surface 101. Certainly, in practice, two cameras may be arranged, in which one is arranged on the first surface 101 and the other is arranged on the second surface 102 opposite to the first surface 101. The specific location of the speaker, the turn on power button, the indicator light and the USB interface may be arranged as required for those ordinary skilled in the art, which is not recited one by one and not limited specifically herein.

In the embodiment of the disclosure, the thickness of the first component 10 is gradually decreased from the third end lateral portion 1103 to a fourth end lateral portion 1104 opposite to the third end lateral portion 1103. Specifically, the thickness of the table computer is gradually decreased from the first portion 11 to the second portion 12. Two implementations are described in detail below.

In a first implementation, the thickness of the table computer is linearly decreased from the third end lateral portion 1103 to the fourth end lateral portion 1104 opposite to the third end lateral portion 1103. That is to say, the cross section of the table computer is in a long narrow triangular shape or a long narrow trapezoidal shape.

Figure 15A:
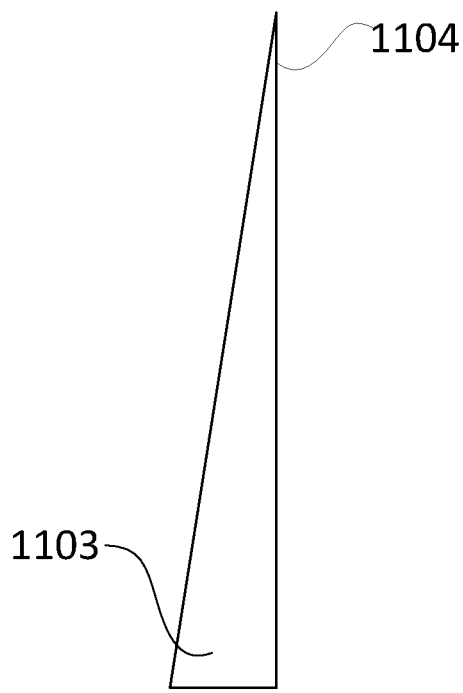
FIG. 15A is a schematic diagram of the cross section of the first portion being in a long narrow triangular shape for the electronic device shown in FIG. 12.
Figure 15B:
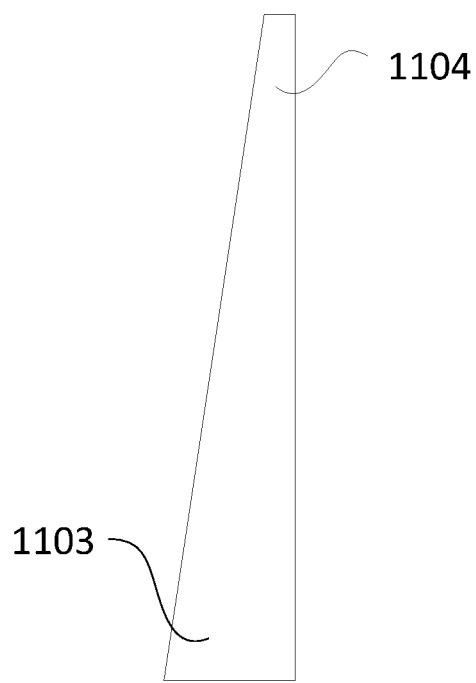
FIG. 15B is a schematic diagram of the cross section of the first portion being in a long narrow trapezoidal shape for the electronic device shown in FIG. 12.

Referring to FIG. 15A and FIG. 15B, FIG. 15A is a schematic diagram of the cross section of the electronic device being in the long narrow triangular shape in the embodiment of the disclosure, and FIG. 15B is a schematic diagram of the cross section of the electronic device being in the long narrow trapezoidal shape in the embodiment of the disclosure.

In a second implementation, the thickness of the table computer is discontinuously decreased from the third end lateral portion 1103 to the fourth end lateral portion 1104 opposite to the third end lateral portion 1103. That is to say, the third end lateral portion 1103 of the table computer is in a protruded shape, and the fourth end lateral portion 1104 is in a thin type.

Figure 16A:
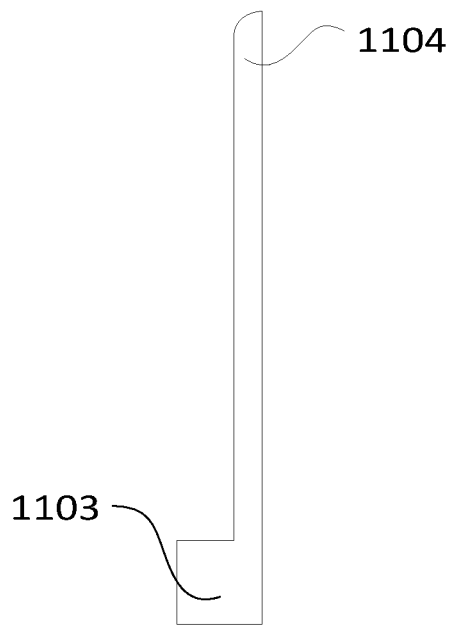
FIG. 16A is a schematic diagram of the cross section of the first portion being in a rectangular protruded shape for the electronic device shown in FIG. 12.
Figure 16B:
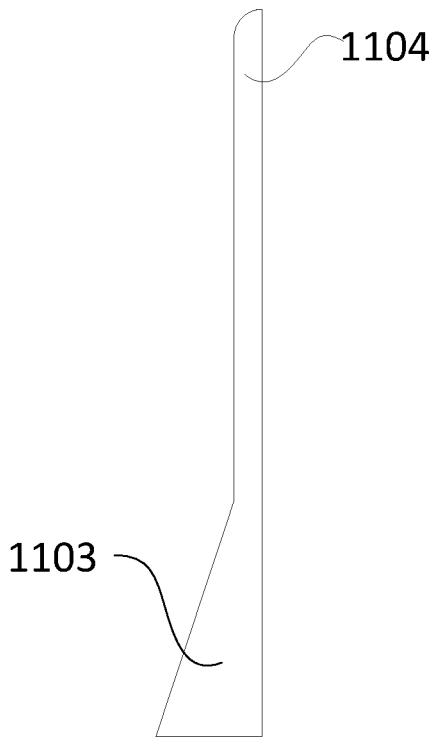
FIG. 16B is a schematic diagram of the cross section of the first portion being in a triangular protruded shape for the electronic device shown in FIG. 12.
Figure 16C:
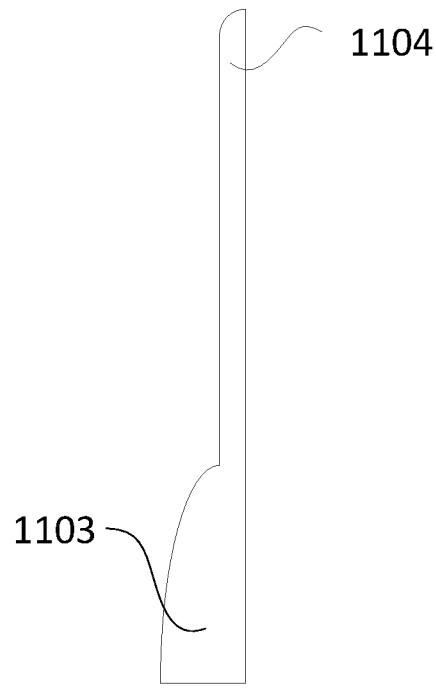
FIG. 16C is a schematic diagram of the cross section of the first portion being in an curved protruded shape for the electronic device shown in FIG. 12.

Referring to FIG. 16A, FIG. 16B and FIG. 16C, FIG. 16A is a schematic diagram of the cross section of the first portion being in a rectangular protruded shape in the embodiment of the disclosure, FIG. 16B is a schematic diagram of the cross section of the first portion being in a triangular protruded shape in the embodiment of the disclosure, and FIG. 16C is a schematic diagram of the cross section of the first portion being in an curved protruded shape in the embodiment of the disclosure.

To achieve the projection function for the table computer, the projection component 30 is arranged on the third end lateral portion 1103 of the first portion 11, and the projection component 30 includes a bump structure 523 arranged at a first point on the projection lens 301 in the embodiment of the disclosure. In practice, the projection component 30 is arranged on the third end lateral portion 1103 with greater thickness of the table computer. The size of the projection component 30 depends on the thickness of the first portion 11 of the table computer. The projection component 30 is fixed in the table computer, so that it is difficult to depart the projection component 30 by the user from the table computer.

In practice, the projection component 30 may be fixed in the first component 10 of the table computer via a bayonet, a strip, fixing glue or a cavity matched in shape with the projection component 30. In order to prevent physical damage occurring in use, the projection lens 301 and the first portion 11 are kept in a whole plane, or a first plane in which the projection lens 301 lies lower than a second plane in which the first portion 11 lies.

To achieve the focusing function for the projection component in the table computer, the adjustment structure 61 is further arranged at the first portion 11 of the table computer, and the adjustment structure 61 includes a slide block 51 and a pushing structure 52 extending in the slide block 51. The pushing structure 52 is arranged to be passable through the elongated hole 1021, and the slide block 51 is exposed on the second surface 102, for a sliding operation by a user.

In practice, the shape of the slide block 51 may be elongated or round, and the shape of the pushing structure 52 may be elongated or round, which may be arranged as required for those ordinary skilled in the art, and not limited specifically herein.

To achieve the focusing function for the projection lens 301 in the table computer, two implementations are described in detail below.

In a first implementation, the transmission structure 90 is arranged at the first end with greater thickness of the table computer. The transmission structure 90 includes a sector structure 521, and a long arc-shaped hole 522 is provided on a sector of the sector structure 521, and the bump structure 523 is contained in the long arc-shaped hole 522. The slide block 51, when being operated to move, drives the sector structure 521 to move via the pushing structure 52, the sector structure 521 drives the bump structure 523 to move, the bump structure 523 drives the projection lens 301 to zoom in or out, and the focal length of the projection lens 301 is adjusted.

Furthermore, a through-hole 524 is provided at a proximal center of the sector structure 521, the table computer further includes a cylindrical structure 525, and the cylindrical structure 525 is arranged to be passable through the through-hole 524. The slide block 51, when being operated to move, drives the sector structure 521 to rotate around the cylindrical structure 525 via the pushing structure 52, the sector structure 521 drives the bump structure 523 to move, the bump structure 523 drives the projection lens 301 to zoom in or out, and the focal length of the projection lens 301 is adjusted.

Furthermore, a housing opening is provided at a distal center of the sector structure 521 to contain the pushing structure 52, and when the slide block 51 is operated to move, a thrust toward right or left is generated in the housing opening via the pushing structure 52 and drives the sector structure 521 to rotate around the cylindrical structure 525, the sector structure 521 drives the bump structure 523 to move, the bump structure 523 drives the projection lens 301 to zoom in or out, and the focal length of the projection lens 301 is adjusted.

Referring to FIG. 13, FIG. 13 is a local schematic structural diagram of the transmission structure and the adjustment structure of the electronic device according to an embodiment of the disclosure.

In the embodiment of the disclosure, the electronic device being a tablet computer is taken as an example, and the process of focusing is as follows. In the case that the projection is unclear and the adjustment of the focal length is required for the projection component 30, firstly, the slide block 51 is operated to move to left or right, the slide block 51 drives the pushing structure 52 connected to the slide block 51 to move to left or right. Since the pushing structure 52 is arranged in the housing opening, the movement of the pushing structure 52 transmits a thrust toward right or left to the sector structure 521, the thrust drives the sector structure 521 to rotate around the cylindrical structure 525, and the long arc-shaped hole 522 is also rotated during the rotation of the sector structure 521. Since the bump structure 523 is contained in the long arc-shaped hole 522 42, the edge of the rotated long arc-shaped hole 522 42 contacted with the bump structure 523 transmits a thrust forward or backward to the bump structure 523 to drive the bump structure 523 to move forward or backward. The movement forward or backward of the bump structure 523 drives the projection lens 301 connected to the bump structure 523 to zoom in or out, and finally the focal length of the projection lens is adjusted.

In a second implementation, a fixed hole 526 is provided on the projection lens 301, the pushing structure 52 is inserted and fixed in the fixed hole 526. The slide block 51, when being operated to move, drives the projection lens 301 to zoom in or out via the pushing structure 52, and the focal length of the projection lens 301 is adjusted.

Figure 17:
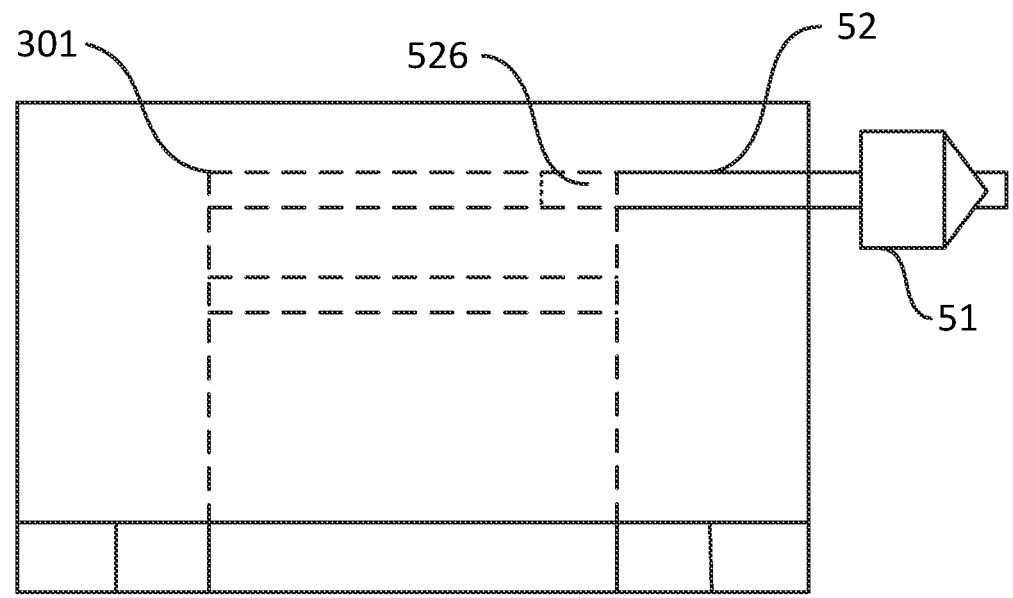
FIG. 17 is another schematic structural diagram of the transmission structure of the electronic device shown in FIG. 1.

Referring to FIG. 17, FIG. 17 is another local schematic structural diagram of the transmission structure of the electronic device according to an embodiment of the disclosure.

In the embodiment of the disclosure, the electronic device being a tablet computer is taken as an example, and the process of focusing is as follows.

In the case that the projection is unclear and the adjustment of the focal length is required for the projection component 30, firstly, the slide block 51 is operated to move to left or right, the slide block 51 drives the pushing structure 52 connected to the slide block 51 to move to left or right. Since the pushing structure 52 is fixed in the fixed hole 526, a thrust toward right or left generated by the movement toward right or left of the pushing structure 52 is transmitted to the projection lens 301 via the fixed hole 526, the projection lens 301 is driven to zoom in or out, and finally the focal length of the projection lens is adjusted.

To enhance the user experience in order that the desired focal length is adjusted rapidly by the user, at least one focal length value in the range of variable focal lengths for the projection lens 301 is provided on the upper edge or the lower edge of the elongated hole 1021 in the embodiment of the disclosure. In practice, the maximum and minimum of the variable focal lengths may be marked on the upper edge of the elongated hole 1021 of the table computer; alternatively, the maximum, minimum and median of the variable focal lengths may be marked on the upper edge of the elongated hole 1021 of the table computer. Certainly, it may be specifically arranged as required actually for those skilled in the art, and not recited one by one herein.

In the embodiment of the disclosure, the electronic device further includes a second component 80 arranged on the first portion 11, and the second component 80 includes a connecting shaft 81 and a support 82.

The support 82 is movable relative to the first component 10 by means of the connecting shaft 81, the support 82 is configured to support the first component 10 when the support 82 is moved to a first location relative to the first component 10.

Figure 18A:
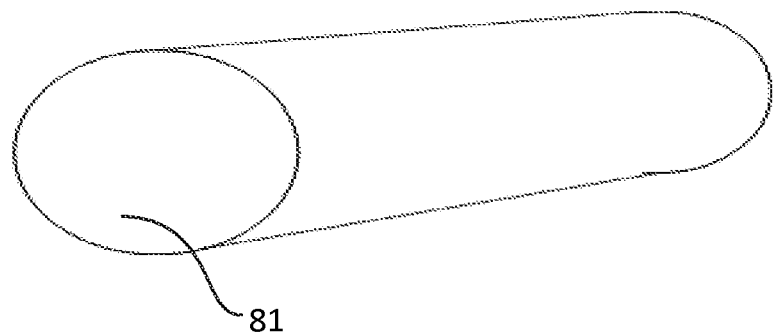
FIG. 18A-18B are schematic structural diagrams of the shaft of the electronic device shown in FIG. 12.
Figure 18B:
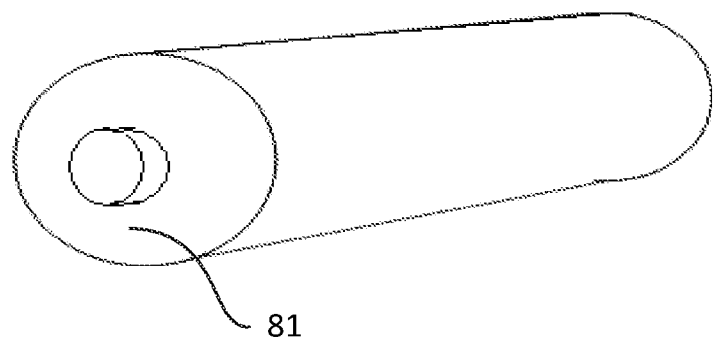

In practice, the connecting shaft 81 may be one shaft with constant diameter as shown in FIG. 18A, or may be consisted of multiple shafts with different diameters as shown in FIG. 18B. In the case that the connecting shaft 81 is one shaft with constant diameter, the manufacturing process is simple and the cost is low relatively. In the case that the connecting shaft 81 is consisted of multiple shafts with different diameters, since there are multiple shafts with different diameters, the shaft with smaller diameter in the multiple shafts with different diameters is connected to or embedded into the corresponding connection portion of the first component 10 of the table computer during the rotation, and therefore the connecting shaft 81 is not easily to fall off during the rotation. Certainly, in practice, it may be arranged as required by those skilled in the art, and not limited specifically in the disclosure.

Figure 19:
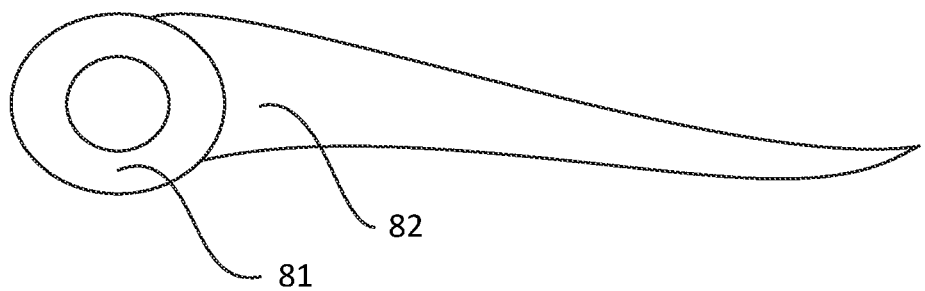
FIG. 19 is a schematic structural diagram of the support of the electronic device shown in FIG. 12.

In practice, at least one surface of the support 82 may be a plane, or may be a curved surface, as shown in FIG. 19. In the case that at least one surface of the support 82 is a curved surface, once the support 82 is placed on a plane such as a table top, there are at least two surfaces for the support 82 contacted with the table top. In this case, the force supporting the first component 10 from the support 82 is greater. In the case that at least one surface of the support 82 is a plane, once the support 82 is placed on a plane such as a table top, there is only one surface for the support 82 contacted with the table top. In this case, the force supporting the first component 10 from the support 82 is less, and the electronic device may slid due to the self gravity or an external thrust in use.

In the embodiment of the disclosure, for the convenience of the user, the inclination of the screen can be adjusted as required when the user views the displayed content on the display unit 20 of the electronic device, that is to say, the angle between the support 82 and the first component 10 may be changed in a certain range, such as from 0 degrees to 90 degrees. Moreover, in order that the user can fold the support 82 when a support is not needed for ease of portability, the support 82 is rotatable relative to the first component 10, and the support 82 relative to the first component 10 is rotated in a certain angle range, such as from 0 degrees to 90 degrees, or from 0 degrees to 180 degrees, which may be arranged as required by those skilled in the art, and not limited specifically in the disclosure.

In the technical solution according to the embodiment of the disclosure, the transmission structure is connected to the projection lens in the projection component, and the adjustment structure is connected to the transmission structure. In this case, when the focal length is required to be adjusted for the projection lens, only the adjustment structure is operated to move, the transmission structure connected to the adjustment structure is driven to move, and thus the movement of the transmission structure drives the projection lens to zoom in or out, since the transmission structure is connected to the projection lens. Therefore, the technique problem of the electronic device in the conventional technology that it is difficult to adjust the focal length of projection by utilizing the structure design of the electronic device itself is solved, a focusing button is provided in the internal space of the electronic device, and thus the focal length of projection is adjusted by utilizing the structure design of the electronic device itself.

In the technical solution according to the embodiments of the disclosure, since the connecting shaft and the support are arranged on the first portion, the support is movable relative to the first component by means of the connecting shaft and the support is configured to support the first component. In this case, the support may be rotated by the user to different location to support the electronic device depending on different requirements, so that the electronic device in different forms is provided for the user, and thus the user experience is enhanced.

In the technical solution according to the embodiments of the disclosure, the thickness of the first component is gradually decreased from the first portion to the second portion. In this case, the center of gravity for the electronic device is lower when the first component is supported by the support, and thus the electronic device is supported more steadily.

In the technical solution according to the embodiment of the disclosure, at least one focal length value in the range of variable focal lengths for the projection lens is provided on the upper edge or the lower edge of the elongated hole. In this case, the desired focal length can be adjusted clearly by the user in the focusing operation, and thus the user experience is enhanced.

As shown in FIG. 20 to FIG. 23, a electronic device according to an embodiment of the disclosure includes a projection component 30, an image sensing component 2 and an optical lens assembly 3.

The projection component 30 is configured to receive external image data and convert the external image data into corresponding light for outputting. The "corresponding" means that a color in the external image data is converted into light with corresponding color. For example, red in the external image data is converted into red light, and white in the external image data is converted into white light.

The image sensing component 2 is configured to convert the light projected onto the image sensing component 2 into a corresponding electrical signal for outputting, so that the electrical signal is converted into a digital signal for storing in the electronic device such as a computer. The light projected onto the image sensing component 2 is generally a projection of an external scene. The specific structure of the image sensing component 2 is a conventional structure, and may be selected from the conventional structures, which will not be described in detail here.

Figure 20:
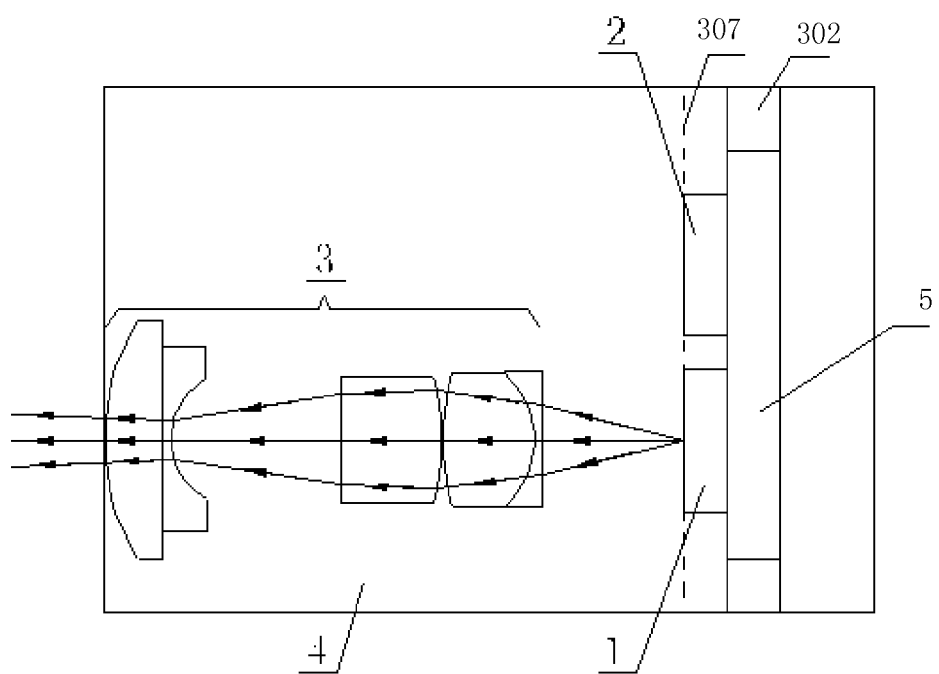
FIG. 20 is a schematic structural diagram of a electronic device according to an embodiment of the disclosure, where an optical lens assembly and a projection component have a first relative position relation.
Figure 21:
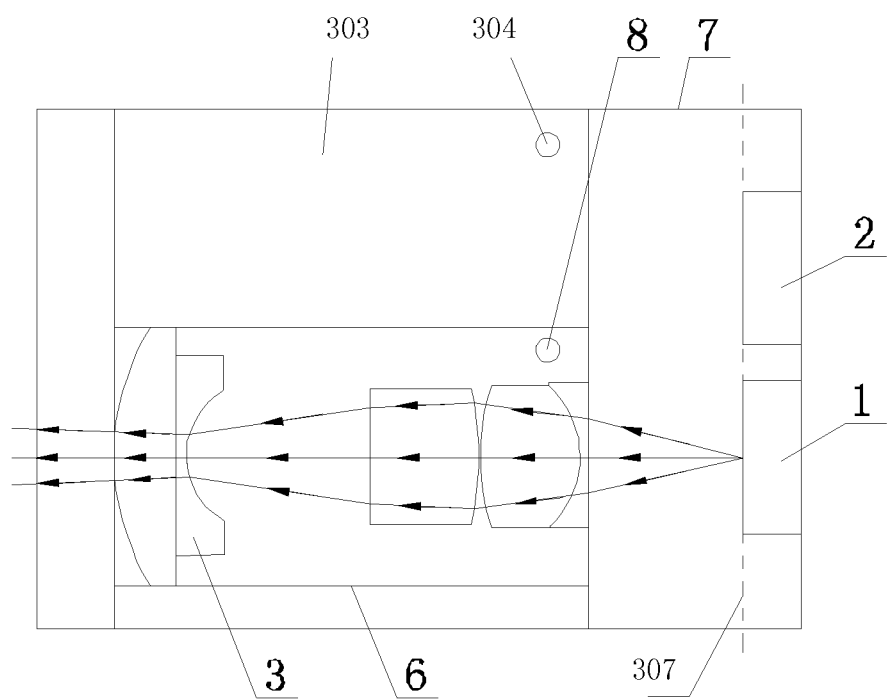
FIG. 21 is a schematic structural diagram of another electronic device according to an embodiment of the disclosure, where an optical lens assembly and a projection component have a first relative position relation.
Figure 22:
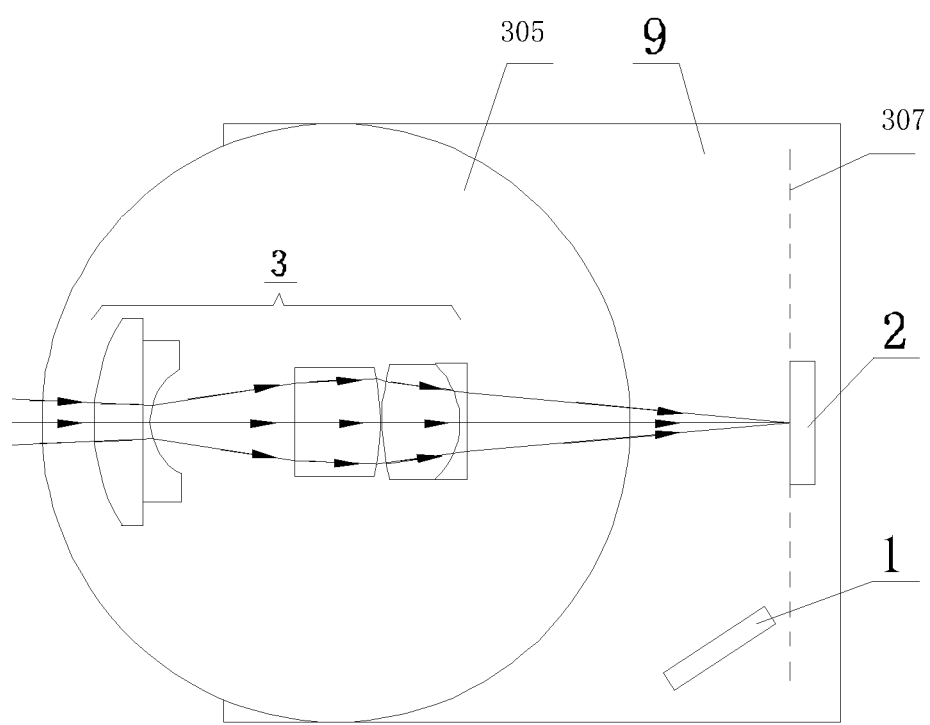
FIG. 22 is a schematic structural diagram of yet another electronic device according to an embodiment of the disclosure, where an optical lens assembly and an image sensing component have a first relative position relation.
Figure 23:
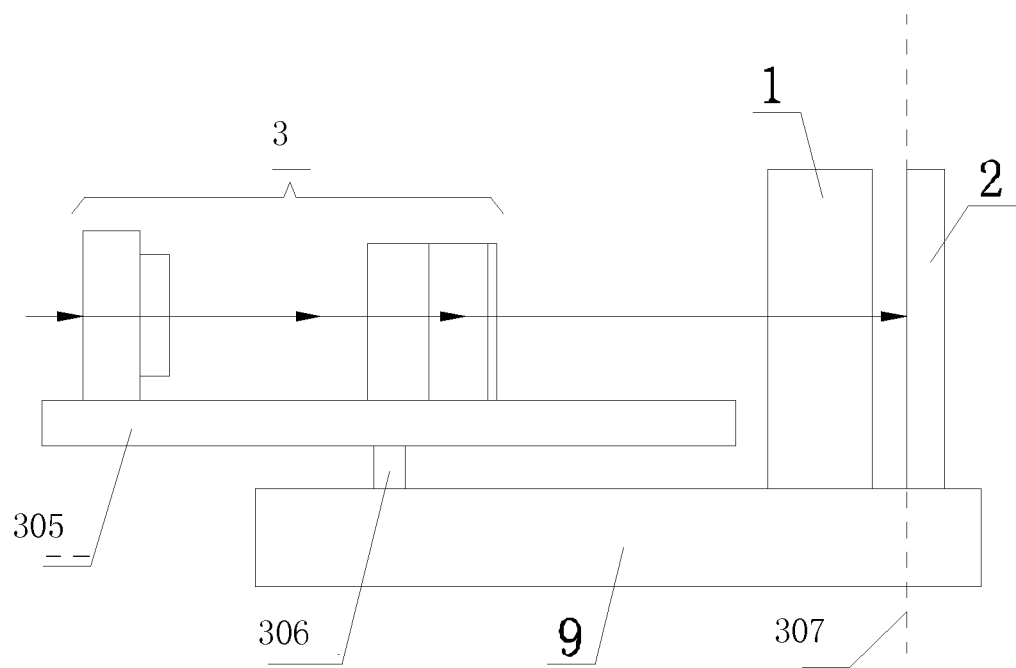
FIG. 23 is a front view of FIG. 22.

The optical lens assembly 3 has the following two structural states. In a first structural state, as shown in FIG. 20 and FIG. 21, the optical lens assembly 3 and the projection component 30 have a first relative position relation, in which the optical lens assembly 3 projects the light emitted from the projection component 30 in a zooming-in manner, so that the electronic device may project outwards. In a second structural state, as shown in FIG. 22 and FIG. 23, the optical lens assembly 3 and the image sensing component 2 have the first relative position relation, in which the optical lens assembly 3 focus external light traveling through the optical lens assembly and projects the focused light onto the image sensing component 2, so that the electronic device may shoot from the external view. The optical lens assembly 3 may be connected to the projection component 30 or the image sensing component 2 selectively as required, so that the electronic device projects or shoots.

The electronic device described in the disclosure includes only one optical lens assembly 3. The optical lens assembly 3 and the projection component 30 have a first relative position relation in a case of a projection operation of the electronic device, and the optical lens assembly 3 and the image sensing component 2 have a second relative position relation in a case of a camera operation of the electronic device. The electronic device described in the disclosure has both the projection function and the camera function, and the projection component 30 and the image sensing component 2 share the one optical lens assembly 3. As compared with the conventional device, in the electronic device described in the disclosure, one more optical lens assembly 3 is saved, then utilization of the internal space of the electronic device is increased, the structure of the electronic device is more compact, and the manufacture cost is reduced significantly.

As shown in FIG. 20 to FIG. 23, the optical lens assembly 3 in an embodiment of the disclosure includes multiple optical lenses, and the multiple optical lenses are combined as required, so that the optical lens assembly 3 has the required function.

Further, a center axis of the optical lens assembly 3 coincides with a center axis of the projection component 30 when the optical lens assembly 3 and the projection component 30 have the first relative position relation. The center axis of the optical lens assembly 3 coincides with a center axis of the image sensing component 2 when the optical lens assembly 3 and the image sensing component 2 have the second relative position relation.

Further, to achieve the function of the projection component 30, i.e., to make sure that projection component 30 receives the external image data and converts the image data into the corresponding light for outputting, in an embodiment, the projection component 30 includes a light source (not shown) and a projection display (not shown), is further provided in the disclosure. The light source is configured to project light onto the projection display upon the light source being turned on, and the projection display is configured to receive the external image data, modulate the incident light from the source light in accordance with the external image data, and output corresponding light, thus the projection component 30 receives the external image data and converts the external image data into corresponding light for outputting. The structure of the projection display is a conventional structure, and may be selected from the conventional structures, which will not be described in detail here.

Further, to make sure that the optical lens assembly 3 and the projection component 30 have the first relative position relation and the optical lens assembly 3 and the image sensing component 2 have the second relative position relation respectively, in an embodiment, the optical lens assembly 3 has a focal plane 307 including a projection area (not shown), is further provided in the disclosure, as shown in FIG. 20 to FIG. 23. In the projection area, the external light traveling through the optical lens assembly 3 are focused. If a beam of parallel light is incident from a side of the optical lens assembly 3, the optical lens assembly 3 may focus the beam of parallel light onto a point in the projection area. Correspondingly, if a bunch of light is projected from a point in the projection area, onto the optical lens assembly 3, the optical lens assembly 3 may out the bunch of light in parallel. The optical lens assembly 3 may keep the first or second relative position relation with the projection component 30 or the image sensing component 2 which is located in the projection area.

The electronic device further includes a position switching device. The position switching device is configured to adjust a position of one or more of the projection component 30, the image sensing component 2 and the optical lens assembly 3 under an external stress, to make the projection component 1 and the image sensing component 2 within the projection area and keep the first relative position relation between the projection component 30 and the optical lens assembly 3 and the second relative position relation between the image sensing component 2 and the optical lens assembly 3.

In an embodiment, as shown in FIG. 20, the position switching device includes a first support plate 4 and a base 5. The optical lens assembly 3 is mounted on the first support plate 4 and is fixed relative to the first support plate 4, so that the position of the optical lens assembly 3 on the first support plate 4 is fixed. A first sliding groove 302 is provided in the first support plate 4. The projection component 30 and the image sensing component 2 are mounted on the base 5 and are fixed relative to the base 5, so that the projection component 30 and the image sensing component 2 may move with the base 5. The projection component 30 and the image sensing component 2 are provided adjacently, and the base 5 is slidably provided in the first sliding groove 302, so that the projection component 30 and the image sensing component 2 may slide with the base 5 along the first sliding groove 302. The projection area is provided on a movement path of the projection component 30 and the image sensing component 2. Specifically, the position of the optical lens assembly 3 on the first support plate 4 is fixed. If a stress is applied on the base 5 to make the base 5 slide along the first sliding groove 302, the projection component 30 and the image sensing component 2 may slide with the base 5 along the first sliding groove 302 to the projection area, so that the first relative position relation between the optical lens assembly 3 and the projection component 1 and the second relative position relation between the optical lens assembly 3 and the image sensing component 2 may be kept, thus the function of position switching device is achieved.

Further, in another embodiment, to achieve the function of the position switching device described above, as shown in FIG. 21, in an embodiment, the position switching device which includes a pedestal 6 and a second support plate 7 is further provided in the disclosure. The optical lens assembly 3 is provided on the pedestal 6 and is fixed on the pedestal 6, so that the optical lens assembly 3 moves with the pedestal 6. A second sliding groove 303 is provided in the second support plate 7, the pedestal 6 is slidably provided in the second sliding groove 303, so that the pedestal 6 slides back and forth along the second sliding groove 303 and thus the optical lens assembly 3 slides with the pedestal 6 along the second sliding groove 303. The projection component 30 and the image sensing component 2 are mounted on the second support plate 7, and are provided on a movement path of the projection area. Specifically, the projection component 30 and the image sensing component 2 are fixed on the second support plate 7. If a stress is applied on the pedestal 6 to make the pedestal 6 slide along the second sliding groove 303, the pedestal 6 drives the optical lens assembly 3 to slide together, the projection area is moved respectively to the projection component 1 and the image sensing component 2 with the movement of the optical lens assembly 3, so that the relative position between the optical lens assembly 3 and the projection component 30 and the relative position between the optical lens assembly 3 and the image sensing component 2 may be kept, for achieving the function of position switching device.

Further, to keep the stability of the relative position between the optical lens assembly 3 and the projection component 1 or the image sensing component 2 while keeping the first or second relative position between the lens assembly 3 and the projection component 1 or the image sensing component 2 respectively, as shown in FIG. 21, in an embodiment, the position switching device which includes a positioning button 8 is further provided in the disclosure. The positioning button 8 is provided on the pedestal 6. The second support plate 7 includes at least two positioning holes 304. The positioning button 8 is inserted into the positioning hole 304 when the optical lens assembly 3 and the projection component 1 have the first relative position relation or when the optical lens assembly 3 and the image sensing component 2 have the second relative position relation, so that the relative position between the lens assembly 3 and the projection component 30 or the image sensing component 2 is fixed. The specific structure of the positioning button 8 is a conventional structure, and may be selected from the conventional structures, which will not be described in detail here.

Further, in another embodiment, to achieve the function of the position switching device described above, i.e., to make sure that the projection component 30 and the image sensing component 2 are in the projection area, and to make sure that the optical lens assembly 3 and the projection component 30 have the first relative position relation and the optical lens assembly 3 and the image sensing component 2 have the second relative position relation respectively, in an embodiment, the position switching device which further includes a fixing seat 9 and a rotary disk 305 is further provided in the disclosure, as shown in FIG. 22 and FIG. 23. The rotary disk 305 is provided with a rotary spindle 306. The rotary disk 305 is rotatably connected to the fixing seat 9 via the rotary spindle 306, so that the rotary disk 305 rotates relative to the fixing seat 9. The optical lens assembly 3 is mounted on the rotary disk 305 and is fixed relative to the rotary disk 305, so that the optical lens assembly 3 moves with the rotary disk 305. The projection component 30 and the image sensing component 2 are mounted in the fixing seat 9, and are provided on a movement path of the projection area. Specifically, the position of the projection component 30 and the image sensing component 2 on the fixing seat 9 are fixed. If a stress is applied on the rotary disk 305 to make the rotary disk 305 rotate relative to the fixing seat 9, the optical lens assembly 3 rotates with the rotary disk 305, the projection area moves respectively to the projection component 30 and the image sensing component 2 during the rotation of the optical lens assembly 3, so that the first relative position relation between the optical lens assembly 3 and the projection component 30 and the second relative position relation between the optical lens assembly 3 and the image sensing component 2 may be kept, for achieving the function of position switching device.

Further, to make the rotary disk 305 rotate relative to the fixing seat 9 via the rotary spindle 306, in an embodiment, a shaft hole (not shown) is provided in the fixing seat 9. An end of the rotary spindle 306 is mounted in the shaft hole and is in rotatable cooperation with the shaft hole, and the other end of the rotary spindle 306 is connected to the rotary disk 305, so that the rotary spindle 306 is driven to rotate inside the shaft hole of the fixing seat 9 via the end of the rotary spindle 306.

Further, the electronic device described above may be a cell phone, a tablet computer or a laptop computer, which may be set according to the practical requirement of a user.

In the above, the preferred embodiments according to the present disclosure have been described. However, additional variations and modifications may be made to the embodiments by those skilled in the art once they learn the basic creative concept. Therefore, the appended claims intend to be explained as including all the variations and modifications falling within the scope of the present disclosure and the preferred embodiments.

It is obvious that various changes and variations may be made to the present disclosure by those skilled in the art, without departing from the spirit and scope of the present disclosure. In this case, if these changes and variations of the present disclosure belong to the scope of the claims of the present disclosure and the scope of techniques equivalent to the present disclosure, the present disclosure intends to contain these changes and variations therein.

The invention claimed is:

1. An electronic device, comprising:
a first component comprising a first portion and a second portion opposite to the first portion; wherein the thickness of the first component is gradually decreased from the first portion to the second portion;
a second component arranged on the first portion and comprising a connecting shaft and a support, wherein a cavity is arranged in the connecting shaft;
a display unit arranged on a first surface of the first component; and
a projection component arranged in the cavity.

2. The electronic device according to claim 1, wherein the support is movable with respect to the first component via the connecting shaft, and the support is capable of supporting the first component when being moved to a first relative location with respect to the first component.

3. The electronic device according to claim 1, wherein the electronic device further comprises a battery module, wherein the battery module is arranged in the cavity.

4. The electronic device according to claim 1, further comprising:
a second component arranged on the first portion of the first component and comprising a connecting shaft and a support;
wherein the support is movable with respect to the first component via the connecting shaft, and the support is capable of supporting the first component when being moved to a first relative location with respect to the first component.

5. The electronic device according to claim 1, further comprising a second component comprising a connecting shaft and a support, wherein the second component is arranged at a first portion of the first component, and the support is provided with a hole; and at least one input/output component arranged on a second surface of the first component opposite to the first surface, wherein the support is movable relative to the first component via the connecting shaft, and the at least one input/output component is arranged inside the hole in the case that the support is closely against the second surface.

6. The electronic device according to claim 5, wherein the at least one input/output component is a subwoofer and/or a rear camera.

7. The electronic device according to claim 5, wherein a retaining groove is provided in a hole-corresponding-region of the second surface corresponding to the hole, a retaining snap is provided at a place on the support corresponding to the retaining groove, and the support overlaps with the second surface in the case that the retaining snap is clamped into the retaining groove.

8. The electronic device according to claim 7, wherein a starting button is provided in the hole-corresponding-region, the starting button is provided with a separating element; and in the case that the support overlaps with the second surface and a pressure is applied to the starting button, the separating element is pushed to squeeze the retaining snap to separate the retaining snap from the retaining groove and support is departed from the second surface.

9. The electronic device according to claim 8, wherein the electronic device is switched to a suspending mode via the hole in the case that the support is departed from the second surface and an angle between the support and the first component is greater than or equal to a preset angle when the support moves relative to the first component.

10. The electronic device according to claim 5, further comprising: a focusing structure; and a transmission structure connected to a projection lens of the projection component; wherein the focusing structure is connected to the transmission structure and arranged on a surface of the first component; and wherein in the case that the focusing structure is operated to move, the transmission structure is driven to drive the projection lens to zoom in or out, and the focal length of the projection lens is adjusted.

11. The electronic device according to claim 1, further comprising:

a transmission structure connected to a projection lens in the projection component; and an adjustment structure connected to the transmission structure and arranged on a surface of the first component, wherein the adjustment structure drives the transmission structure to move when being operated to move, the transmission structure drives the projection lens to zoom in or out, and a focal length of the projection lens is adjusted.

12. The electronic device according to claim 11, wherein an elongated hole is provided in a second surface region of a second surface of the first component corresponding to the transmission structure, and the second surface of the first component is opposite to the first surface.

13. The electronic device according to claim 12, wherein the adjustment structure comprises a slide block and a pushing structure extending in the slide block, the pushing structure is arranged to be passable through the elongated hole, and the slide block is exposed on the second surface, for a sliding operation by a user.

14. The electronic device according to claim 13, wherein the projection component comprises:

a bump structure arranged at a first point on the projection lens.

15. The electronic device according to claim 14, wherein the transmission structure comprises:

a sector structure, wherein a long arc-shaped hole is provided on a sector of the sector structure, and the bump structure is contained in the long arc-shaped hole;

wherein the slide block, when being operated to move, drives the sector structure to move via the pushing structure, the sector structure is driven to drive the bump structure to move, the bump structure is driven to drive the projection lens to zoom in or out, and the focal length of the projection lens is adjusted.

16. The electronic device according to claim 15, wherein a through-hole is provided at a proximal center of the sector structure, the electronic device further comprises a cylindrical structure, the cylindrical structure is arranged to be passable through the through-hole; and wherein the slide block, when being operated to move, drives the sector structure to rotate around the cylindrical structure via the pushing structure, the sector structure is driven to drive the bump structure to move, the bump structure is driven to drive the projection lens to zoom in or out, and the focal length of the projection lens is adjusted.

17. The electronic device according to claim 16, wherein a housing opening is provided at a distal center of the sector structure to contain the pushing structure, and when the slide block is operated to move, a thrust toward right or left is generated in the housing opening via the pushing structure and drives the sector structure to rotate around the cylindrical structure, the sector structure is driven to drive the bump structure to move, the bump structure is driven to drive the projection lens to zoom in or out, and the focal length of the projection lens is adjusted.

18. The electronic device according to claim 13, wherein a fixed hole is provided on the projection lens, the pushing structure is inserted and fixed in the fixed hole; and wherein the slide block, when being operated to move, drives the projection lens to zoom in or out via the pushing structure, and the focal length of the projection lens is adjusted.

19. The electronic device according to claim 1, further comprising an image sensing component, and an optical lens assembly, wherein:

the projection component is configured to receive external image data and convert the external image data into corresponding light for outputting;

the image sensing component is configured to convert the light projected onto the image sensing component into a corresponding electrical signal for outputting;

the optical lens assembly and the projection component have a first relative position relation for projecting the light emitted from the projection component in a zooming-in manner in a case of a projection operation of the electronic device, and the optical lens assembly and the image sensing component have a second relative position relation for focusing external light traveling through the optical lens assembly and projecting the focused light onto the image sensing component in a case of a camera operation of the electronic device.

20. The electronic device according to claim 19, wherein a center axis of the optical lens assembly coincides with a center axis of the projection component when the optical lens assembly and the projection component have the first relative position relation, and the center axis of the optical lens assembly coincides with a center axis of the image sensing component when the optical lens assembly and the image sensing component have the second relative position relation.

21. The electronic device according to claim 19, wherein the optical lens assembly has a focal plane comprising a projection area in which the external light traveling through the optical lens assembly are focused, and wherein the electronic device further comprises a position switching device, which is configured to adjust a position of one or more of the projection component, the image sensing component and the optical lens assembly under an external stress, to make the projection component and the image sensing component within the projection area and keep the first relative position relation between the projection component and the optical lens assembly and the second relative position relation between the image sensing component and the optical lens assembly.

22. The electronic device according to claim 21, wherein the position switching device comprises:
a first support plate, wherein the optical lens assembly is mounted on the first support plate and is fixed relative to the first support plate, and a first sliding groove is provided in the first support plate; and
a base, wherein the projection component and the image sensing component are mounted on the base and are fixed relative to the base, the projection component and the image sensing component are provided adjacently, the base is slidably provided in the first sliding groove, and the projection area is provided on a movement path of the projection component and the image sensing component.

23. The electronic device according to claim 21, wherein the position switching device comprises:
a pedestal, wherein the optical lens assembly is provided on the pedestal and is fixed relative to the pedestal; and
a second support plate, wherein a second sliding groove is provided in the second support plate, the pedestal is slidably provided in the second sliding groove, and the projection component and the image sensing component are mounted on the second support plate and are provided on a movement path of the projection area of the optical lens assembly.

24. The electronic device according to claim 23, wherein the position switching device further comprises:
a positioning button provided on the pedestal, wherein the second support plate comprises at least two positioning holes, and the positioning button is inserted into the positioning hole when the optical lens assembly and the projection component have the first relative position relation or when the optical lens assembly and the image sensing component have the second relative position relation.

25. The electronic device according to claim 21, wherein the position switching device comprises a fixing seat and a rotary disk;
the rotary disk is provided with a rotary spindle, the rotary disk is rotatably connected to the fixing seat via the rotary spindle, the optical lens assembly is mounted on the rotary disk and is fixed relative to the rotary disk; and
the projection component and the image sensing component are mounted in the fixing seat, and are provided on a movement path of the projection area of the optical lens assembly.

26. The electronic device according to claim 25, wherein a shaft hole is provided in the fixing seat, an end of the rotary spindle is mounted in the shaft hole and is in rotatable cooperation with the shaft hole, and the other end of the rotary shaft is connected to the rotary disk.

27. An electronic device, comprising:
a first component comprising a display unit arranged on a first surface of the first component;
a second component arranged on a first portion of the first component and comprising a connecting shaft and a support, the connecting shaft comprising a cavity; and
a projection component arranged in the cavity;
wherein the support is movable with respect to the first component via the connecting shaft, and the support is capable of supporting the first component when being moved to a first relative location with respect to the first component.

28. The electronic device according to claim 27, further comprising:
a first sub-connecting portion arranged on a first end portion of the first portion; and
a second sub-connecting portion arranged on a second end portion of the first portion;
wherein the first sub-connecting portion and the second sub-connecting portion are respectively sleeved on the connecting shaft, and the connecting shaft is rotatable inside the first and second sub-connecting portions to drive the support to move with respect to the first component.

29. The electronic device according to claim 28, wherein:
the first component comprises a first portion and a second portion opposite to the first portion;
the second component is arranged on the first portion;
the electronic device further comprises a display unit, wherein the display unit arranged on a first surface of the first component;
the projection component is arranged on the first portion;
wherein a first distance between the projection component and a flat surface is changed as the support is rotated, when the support is rotated about the connecting shaft to a first relative location with respect to the first component and the electronic device is in a touch mode in which the electronic device is supported on a flat surface by the support and the second portion.

30. The electronic device according to claim 29, wherein the first component further comprises a second surface opposite to the first face, a first distance is gradually reduced while an angle between the support and the second surface is gradually decreased, and the first distance is gradually increased while the angle between the support and the second surface is gradually increased.

* * * * *